United States Patent
Roberts et al.

(10) Patent No.: US 10,710,910 B2
(45) Date of Patent: Jul. 14, 2020

(54) ELECTROCOAGULATION USING OSCILLATING ELECTRODES

(71) Applicant: UTI LIMITED PARTNERSHIP, Calgary (CA)

(72) Inventors: Edward Roberts, Calgary (CA); Paul Panikulam, Calgary (CA)

(73) Assignee: UTI LIMITED PARTNERSHIP, Calgary (CA)

( * ) Notice: Subject to any disclaimer, the term of this patent is extended or adjusted under 35 U.S.C. 154(b) by 0 days.

(21) Appl. No.: 15/873,501

(22) Filed: Jan. 17, 2018

(65) Prior Publication Data

US 2018/0215635 A1 Aug. 2, 2018

Related U.S. Application Data

(60) Provisional application No. 62/451,411, filed on Jan. 27, 2017.

(51) Int. Cl.
*C02F 1/463* (2006.01)
*C02F 1/56* (2006.01)
(Continued)

(52) U.S. Cl.
CPC ............... *C02F 1/463* (2013.01); *C02F 1/56* (2013.01); *C02F 1/66* (2013.01); *C02F 1/4674* (2013.01);
(Continued)

(58) Field of Classification Search
CPC ...................................................... C02F 1/463
(Continued)

(56) References Cited

U.S. PATENT DOCUMENTS 3,767,542 A * 10/1973 Carlson ............... C02F 1/46109
205/528
4,116,789 A * 9/1978 King ........................ B03C 3/36
204/545
(Continued)

FOREIGN PATENT DOCUMENTS

KR 101232260 B1 2/2013
RU 2175644 C1 11/2001
(Continued)

OTHER PUBLICATIONS

Chen, Y., et al., Application of Pulse Electrocoagulation to dye wastewater treatment. Advanced Materials Research, 2011; 233-235, 444-451.
(Continued)

*Primary Examiner* — Steven A. Friday
(74) *Attorney, Agent, or Firm* — Casimir Jones S.C.; J. Mitchell Jones

(57) ABSTRACT

In alternative aspects, the invention provides electrocoagulation processes and apparatus in which the anode oscillates in the electrochemical cell. In some embodiments, this facilitates control of the mixing conditions at the electrode surface independently from the flow through the cell. A constant DC current may be applied in the electrocoagulation, so that as the anode moves closer to a cathode, the cell voltage will oscillate. This may for example be carried out to provide a comparable degree of electrocoagulation with a net reduction in the energy consumption compared to a non-oscillating cell.

19 Claims, 24 Drawing Sheets

(51) Int. Cl.
*C02F 1/66* (2006.01)
*C02F 103/10* (2006.01)
*C02F 1/461* (2006.01)
*C02F 1/467* (2006.01)

(52) U.S. Cl.
CPC ............ *C02F 1/46109* (2013.01); *C02F 2001/46123* (2013.01); *C02F 2001/46128* (2013.01); *C02F 2001/46152* (2013.01); *C02F 2103/10* (2013.01); *C02F 2201/4613* (2013.01); *C02F 2201/4617* (2013.01)

(58) Field of Classification Search
IPC ..................................................... C02F 1/463
See application file for complete search history.

(56) References Cited

U.S. PATENT DOCUMENTS

| | | | |
|---|---|---|---|
| 5,948,273 A * | 9/1999 | Yoshida | A61L 2/035 |
| | | | 205/751 |
| 6,077,416 A | 6/2000 | Khalemsky | |
| 6,294,061 B1 | 9/2001 | Morkovsky et al. | |
| 6,706,168 B2 * | 3/2004 | Igarashi | C02F 1/46104 |
| | | | 204/229.4 |
| 7,759,536 B2 | 7/2010 | Frisky et al. | |
| 8,347,960 B2 | 1/2013 | Mothersbaugh et al. | |
| 8,709,222 B2 | 4/2014 | Gilmore et al. | |
| 2005/0230321 A1 * | 10/2005 | Berrak | C02F 1/463 |
| | | | 210/748.01 |
| 2011/0062018 A1 * | 3/2011 | Blum | C02F 1/46114 |
| | | | 204/288.2 |
| 2015/0166383 A1 * | 6/2015 | Visnja | C02F 1/001 |
| | | | 205/752 |
| 2017/0113952 A1 * | 4/2017 | Stephenson | B01D 21/00 |

FOREIGN PATENT DOCUMENTS

| | | |
|---|---|---|
| WO | WO2012100322 A1 | 8/2012 |
| WO | WO2013119718 A1 | 8/2013 |
| WO | WO2014066923 A1 | 5/2014 |
| WO | WO2015054748 A1 | 4/2015 |

OTHER PUBLICATIONS

Liu, H., et al. Electrocoagulation in Water Treatment. In Electrochemistry for the Environment, 2010; 245-263. Springer.
Masliyah, J., et al., Understanding Water-Based Bitumen Extraction from Athabasca Oil Sands. The Canadian Journal of Chemical Engineering, 2008; 82, 628-654.
Mikula, R. J., et al., Water Use in Bitumen Production: Tailings Management in Surface Mined Oil Sands. Proceedings of the Canadian International Petroleum Conference, Jun. 17-19, 2008, Calgary, Alberta, Petroleum Society of Canada.
Mollah, M. Y., Electrocoagulation (EC)—Science and Application. Journal of Hazardous Materials, 2001; 84, 29-41.
Small, R.J. et al. Micro Magazine.com. (2007). Micro Magazine. http://micromagazine.fabtech.org/archive/98/01/small.html.
Ahmadun, F., Pendashteh, A., Abdullah, L., Biak, D., Madaeni, S., & Abidin, Z. (2009). Review of technologies for oil and gas produced water treatment. Journal of Hazardous Materials, 170, 530-551.
Ali, I., Asim, M. & Khan, T. A. (2013). Arsenite removal from water by electro-coagulation on zinc-zinc and copper-copper electrodes. International Journal of Environmental Science and Technology, 10, 377-384.
Allen, E. W. (2008). Process water treatment in Canada's oil sands industry: I. Target pollutants and treatment objectives. Journal of Environmental Engineering and Science, 7, 123-138.
America Water Works Association. (1998). Standard Methods for the Examination of Water and Wastewater. Baltimore: United Book Press Inc., 541 pages.

Bryant, J. E., & Haggstrom, J. (2012). An Environmental Solution to Help Reduce Freshwater Demands and Minimize Chemical Use. Proceedings of the SPE/EAGE European Unconventional Resources Conference and Exhibition, Mar. 20-22, 2008, Vienna, Austria, Society of Petroleum Engineers. 10 pages.
Canizares, P., Jimenez, C., Martinez, F., Saez, C., & Rodrigo, M. (2007). Study of the Electrocoagulation Process Using Aluminum and Iron Electrodes. Industrial and Engineering Chemistry Research, 46, 6189-6195.
Carpenter, N. G. & Roberts, E. P. L. (1999). Mass Transport and Residence Time Characteristics of an Oscillatory Flow Electrochemical Reactor. Chemical Engineering Research and Design, 77, 212-217.
Chen, G. (2004). Electrochemical Technologies in Wastewater Treatment. Separation and Purification Technology, 38, 11-41.
El-Gayer, D.A. et al., *Effect of electrode pulsation on the rate of simultaneous electrochemical recovery of copper and regeneration of ferric salts from dilute solutions Chemical Engineering Journal*, 2010, 162, 877-882.
Emamjomeh, M. M., & Sivakumar, M. (2009). Review of pollutants removed by electrocoagulation and electrocoagulation/flotation processes. Journal of Environmental Management, 90, 1663-1679.
Fajardo, A. S., Rodrigues, R. F., Martins, R. C., Castro, L. M., & Quinta-Ferreira, R. M. (2015). Phenolic wastewaters treatment by electrocoagulation process using Zn anode. Chemical Engineering Journal, 275, 331-341.
Harif, T., & Adin, A. (2007). Characteristics of aggregates formed by electroflocculation of a colloidal suspension. Water Research, 41, 2951-2961.
Husein, M., Derizadeh, A., & Harding, T. (2011). Experimental and Modeling Study of MEUF Removal of Naphthenic Acids. Desalination, 273, 352-358.
Keshmirizadeh, E., Yousefi, S., & Rofouei, M. K. (2011). An investigation on the new operational parameter effective in Cr(VI) removal efficiency: A study on electrocoagulation by alternating pulse current. Journal of Hazardous Materials, 190, 119-124.
MA, H., & Wang, B. (2006). Electrochemical pilot-scale plant for oil field produced wastewater by M/C/Fe electrodes for injection. Journal of Hazardous Materials, 132, 237-243.
Mikula, R. J., Munoz, V. A., & Omotoso, O. (2008). Water Use in Bitumen Production: Tailings Management in Surface Mined Oil Sands. Proceedings of the Canadian International Petroleum Conference, Jun. 17-19, 2008, Calgary, Alberta, Petroleum Society of Canada.
Mollah, M. Y., Morkovsky, P., Gomes, J. A., Kesmez, M., Parga, J., & Cocke, D. (2001). Electrocoagulation (EC)—science and applications. Journal of Hazardous Materials B84, 112, 29-41.
Moussavi, G., Khosravi, R., & Farzadkia, M. (2011). Removal of petroleum hydrocarbons from contaminated ground water using an electrocoagulation process: Batch and continous experiments. Desalination, 278, 288-294.
Nix, P. G., & Martin, R. W. (1992). Detoxification and Reclamation of Suncor's Oil Sand Tailings Ponds. Environmental Toxicology and Water Quality, 7, 171-188.
Panikulam, Paul Joseph "Electrocoagulation for the Treatment of Oilsands Tailings Water" Thesis submitted to the Faculty of Graduate Studies in partial fulfilment of the requirements for the degree of Master of Science, Chemical Engineering, Graduate Program in Chemical Engineering, Calgary, Alberta, Sep. 2015, 87 pages.
Reynolds, T. & Richards, P., 1996. Unit Operations and Processes in Environmental Engineering. 2nd ed. :Cengage Learning. 815 pages.
Saidi-Mehrabad, A., He, Z., Tamas, I., Sharp, C. E., Brady, A. L., Rochman, F. F., Bodrossy, L., Abell, G. C., Penner, T., Dong, X., Sensen, C. W., & Dunfield, P. F. (2013). Methanotrophic bacteria in oilsands tailings ponds of northern Alberta. The ISME Journal, 7, 908-921.
Vasudevan, S., Lakshmi, J., & Packiyam, M. (2010). Electrocoagulation studies on removal of cadmium using magnesium electrode. Journal of Applied Electrochemistry, 40, 2023-2032.

(56) References Cited

OTHER PUBLICATIONS

Zhu, B., Clifford, D. A., & Chellam, S. (2005). Comparison of electrocoagulation and chemical coagulation pretreatment for enhanced virus removal using microfiltration membranes. Water Research, 39, 3098-3108.

* cited by examiner

ELECTROCOAGULATION USING OSCILLATING ELECTRODES

CROSS REFERENCE TO RELATED APPLICATIONS

This application claims the benefit of U.S. Provisional Application Ser. No. 62/451,411, filed Jan. 27, 2017, which is incorporated herein by reference in its entirety.

FIELD OF THE INVENTION

The invention is in the field of electrochemical apparatus and process, particularly electrocogulation of contaminants in wastewaters.

BACKGROUND OF THE INVENTION

Electrocoagulation (EC) is a water treatment process that has been adapted to remove a number of contaminants from wastewaters, including fine suspended solids, toxic organic matter, silica, and heavy metals (Emamjomeh and Sivakumar, 2009; Mollah et. al, 2001). EC uses an electrochemical cell to generate coagulating agents in the wastewater by electrochemical reactions, generally resulting in flocculation of contaminated particles which separate out by settling or flotation. Conventionally, coagulation and flocculation are performed by the addition of chemicals including metal salts or polymeric flocculants. The electric field used in EC generally enhances the flocculation process by setting the charged colloidal particles in motion resulting in the coagulation of even very fine suspended solids (Harif and Adin, 2007). In addition, EC may be adapted to simultaneously remove heavy metals by precipitation as the pH increases during the process. Furthermore, hydrogen gas bubbles generated by reduction of water at the cathode (2 $H_2O+2e^- \rightarrow H_2+2$ $OH^-$) may lead to floatation of the flocculated particles to the water surface thus providing better separation of contaminants.

The process makes use of an electrochemical cell with two electrode plates, an iron or aluminum anode and a cathode also usually made of iron or aluminum (Liu et al., 2010). Other anode materials have also been reported in literature such as copper (Ali et al., 2013), zinc (Ali et al., 2013; Fajardo et al., 2015), and magnesium (Vasudevan et al., 2010). The wastewater stream is the electrolytic solution.

When current is passed, the anodic material is oxidized to its respective cations which dissolve into the water stream. These metal cations will hydrolyze to form metal hydroxy cations or metal hydroxide precipitates which are excellent coagulating agents. The cationic coagulants generated will neutralize the negative surface charge present on the colloidal matter such as suspended solids or emulsified oil droplets. Hence the electrostatic repulsion among the colloidal particles which hinder separation by settling is eliminated leading to predominantly Van der Waals attraction among the particles which causes coagulation (Liu et al., 2010). The neutral metal precipitates can also coagulate colloidal particles and other contaminants by adsorption of onto the precipitates. The larger aggregates then flocculate and separate out by settling or flotation.

SUMMARY OF THE INVENTION

In alternative aspects, the invention provides electrocoagulation processes and apparatus in which the anode oscillates in the electrochemical cell. In some embodiments, this facilitates control of the mixing conditions at the electrode surface independently from the flow through the cell. A constant DC current may be applied in the electrocoagulation, so that as the anode moves closer to a cathode, the current will increase on one side of the anode and the cell voltage will oscillate. This may for example be carried out to provide a comparable degree of electrocoagulation with a net reduction in the energy consumption compared to a non-oscillating cell. The current at the electrode surface may be made to oscillate, so as to enhance process performance. Exemplary results comparing batch treatment with an oscillating electrode with a stationary electrode showed up to a ~40% reduction in the treatment time, and up to a ~70% reduction in treatment time in a cell configured with multiple corrugated electrodes.

In one aspect, the invention involves the treatment of oil sands tailings water, as well as similar wastewaters. Wastewater of this kind is generally electrolytically conductive due to the presence of sufficient dissolved ions (Allen, 2008), which facilitates relatively low electrolytic solution resistance, leading to relatively low energy requirements in conjunction with increased contaminant removal rates, for example without the necessity for chemical addition.

DETAILED DESCRIPTION OF THE INVENTION

Figure 1:
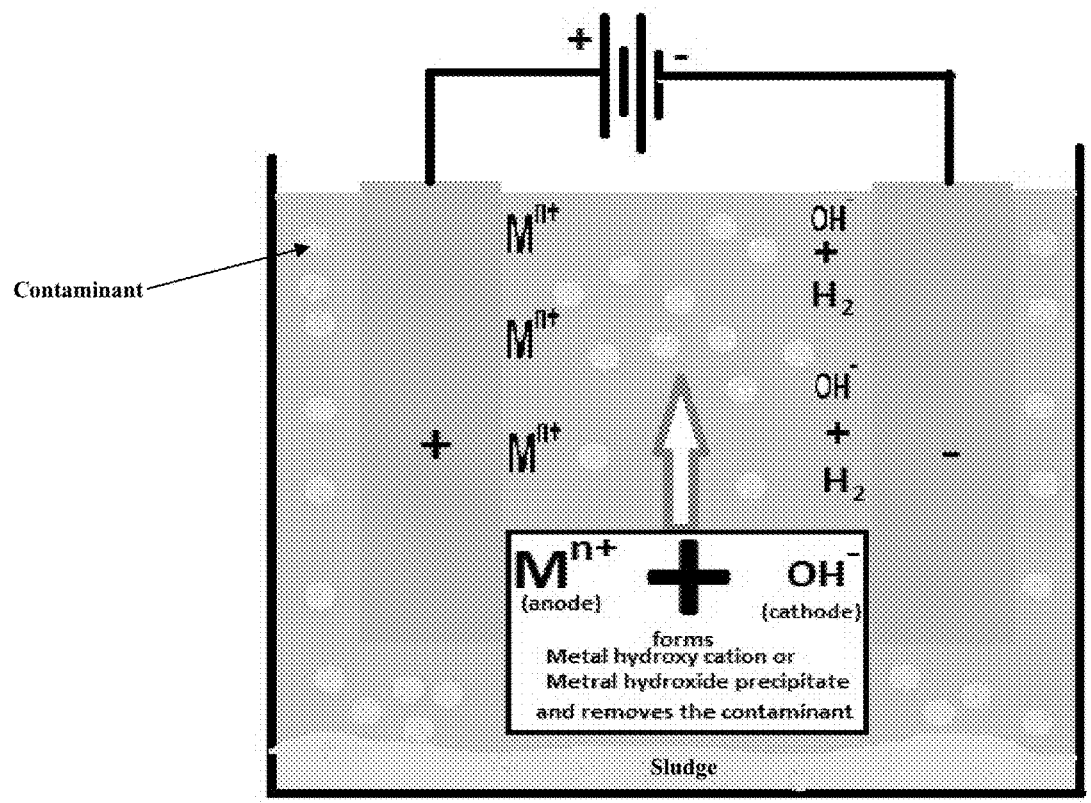
FIG. 1: Electrocoagulation Illustration.

FIG. 1 is a schematic illustration of an electrocoagulation cell. At the cathode, water is reduced generating hydrogen gas and hydroxide ions. The hydroxide ions will increase the pH of the water. The hydrogen gas bubbles will float the lighter flocculated particles such as oil to the water surface. The increase in pH by the generation of hydroxide ions will generally cause the precipitation of other cations present such as heavy metals, calcium and magnesium which reduces hardness. Silica will also precipitate and removal of silica can also occur by adsorption onto the iron or aluminum hydroxide precipitates. Due to the presence of chlorides in some wastewaters, such as oil sands tailings water, in one aspect of the invention oil removal can occur not only by flocculation and flotation but also by oxidation due to free chlorine generation at the anode. The free chlorine generated will also have a disinfecting effect on the water.

Figure 2:
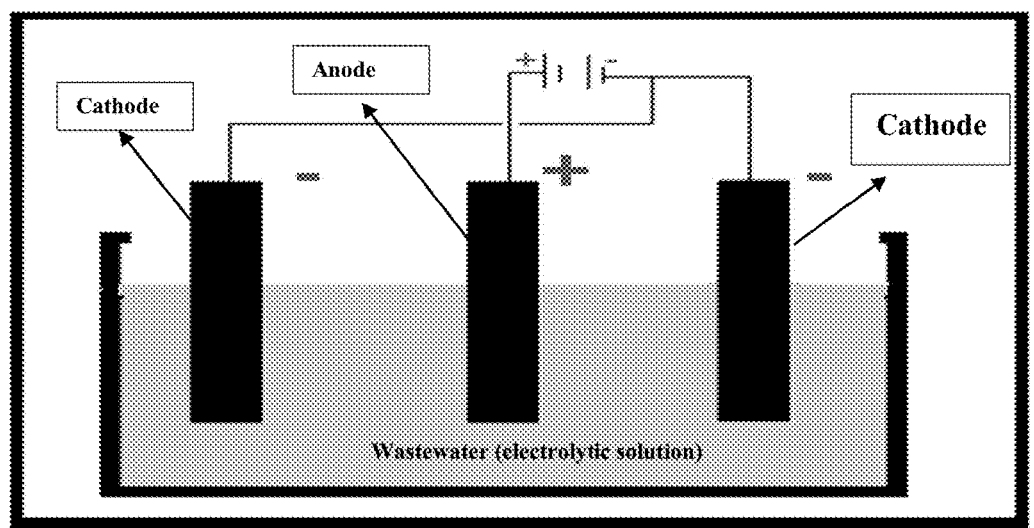
FIG. 2: Schematic diagram of an Electrocoagulation Cell.

FIG. 2 shows a schematic diagram of an EC cell. It is shown with two cathodes, but an EC cell can also be operated with a single cathode. However, a three electrode setup or a stack of electrochemical cells is more representative of a full scale system than a two electrode arrangement, because this makes effective use of the anode surface as it allows current to flow to both sides. The anode is typically either aluminum or steel and the wastewater will be the electrolytic solution, provided it has sufficient conductivity. Pure water will allow current to pass, but will require significantly higher voltage and thus the energy consumption will also be significantly higher.

For the EC process, the electrical current is typically fixed because the amount of metal to be electrodissolved from the anode for coagulation depends on the current passed based on Faraday's Law of electrolysis. The relation is described by the equation below:

$$n = \frac{It}{zF} \quad \text{(Equation 1)}$$

where:

n is the number of moles of metal ion generated at the anode (mol)

I is the current passed (A, C $s^{-1}$)

t is the electrolysis duration (s)

z is the number of moles of electrons involved in the electrochemical reaction per mole of ion generated or consumed. For the aluminum oxidation reaction, $Al \rightarrow Al^{3+}+3e^-$, z=3. For the iron oxidation reaction, $Fe \rightarrow Fe^{3+}+3e^-$, z=3.

F is Faraday's constant (96500 C/mole $e^-$)

Fine colloidal particles don't separate easily in wastewaters; due to the small diameter (1-1000 nm), they settle very slowly. Moreover, the presence of negative surfaces charges that arise from ion exchange between the silica and aluminum in the clay crystal lattice with monovalent ions in water such as hydrogen ions and sodium ions (Canizares et al., 2007), the particles repel each other electrostatically. Thus, the particles don't aggregate easily which further hinders settling.

Figure 3:
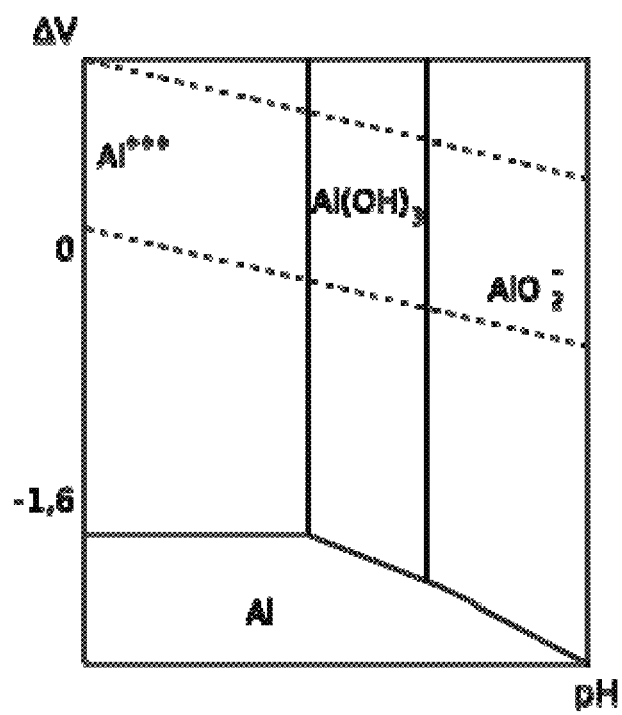
FIG. 3: Pourbaix Diagram for Aluminum.
Figure 4:
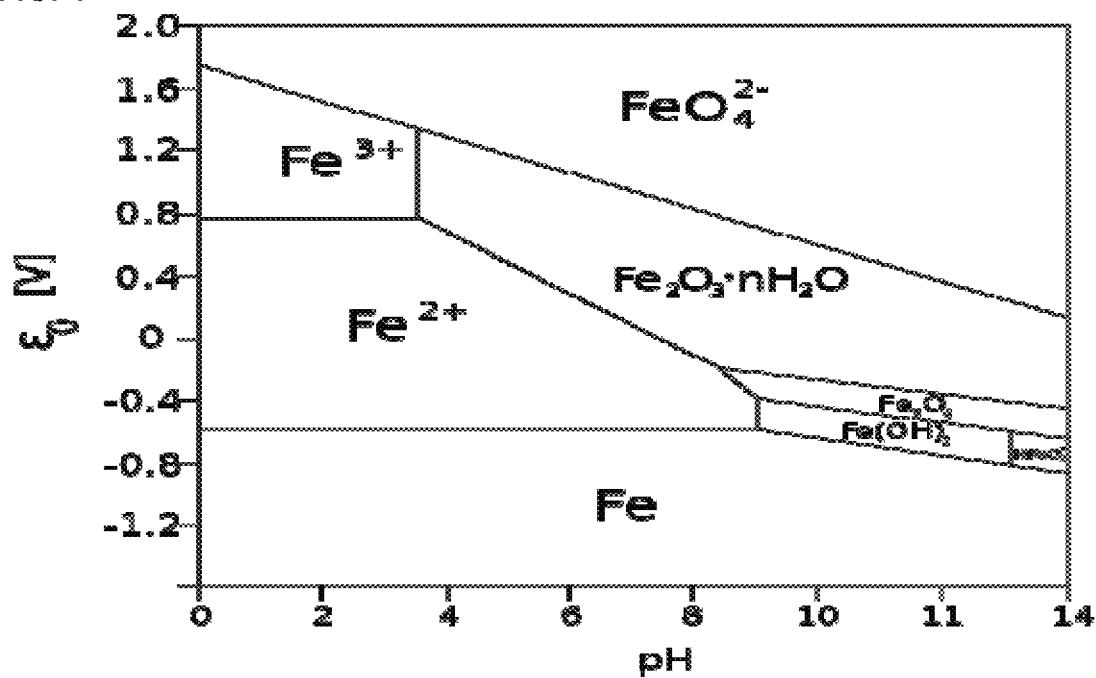
FIG. 4: Pourbaix Diagram for Iron.

Therefore, in some aspects of the invention, an objective of coagulation is to form positively charge species that can neutralize the negative surface charges on these particles. Once neutralized, the particles will flocculate by van-Der Waal's attraction forces and settle faster. This mechanism is charge neutralization coagulation/flocculation. Another mechanism is the formation of large precipitate species that adsorb these fine solids, which then flocculate and form larger species that settle more easily. This mechanism is known as sweep coagulation/flocculation. These coagulating agents are typically generated by dissolving iron or aluminum based metal salts such as alum, ferric chloride, ferric sulfate, etc. at high pH because the pH decreases after dissolution as the metal ions consume the hydroxide ions in water. This results in the formation of their respective metal hydroxyl cations and precipitates which are excellent coagulating agents. pH is a very important factor in coagulation. For aluminum based coagulation, the optimum pH is typically between 4.5 and 8 (Reynolds and Richards, 1996). For iron based coagulation, the optimum pH is between 4 and 12 (Reynolds and Richards, 1996). These pH ranges are considered optimum in order to generate high concentrations of metal hydroxide precipitates (Reynolds & Richards, 1996), so that the predominant contaminant removal mechanism is by sweep flocculation. A diagram that best illustrates the fact that iron is more effective than aluminum at a wider range of pH because it forms higher concentrations of precipitates at a wider range is a Pourbaix diagram. FIGS. 3 and 4 are Pourbaix Diagrams for aluminum and iron respectively. Comparing FIGS. 4 to 3, iron hydroxide precipitates are more thermodynamically stable than aluminum over a wider range of pH. The same coagulating agents can be generated electrochemically by electrocoagulation.

Aspects of the present invention provide methods for the treatment of particular wastewaters, such as oil sands tailings water, using particular electrochemical reactor designs. The Examples below illustrate the effectiveness of electrocoagulation in the removal of fine suspended particles through accelerated settling, including the use of a cell with an anode oscillating between two cathodes, and another cell with multiple electrodes, with both monopolar and bipolar configurations.

Two different EC cell designs are exemplified herein, a cell using flat plate electrodes and an alternative design using corrugated electrodes. These two cell designs are described below.

Flat Plate Cell

Figure 5:
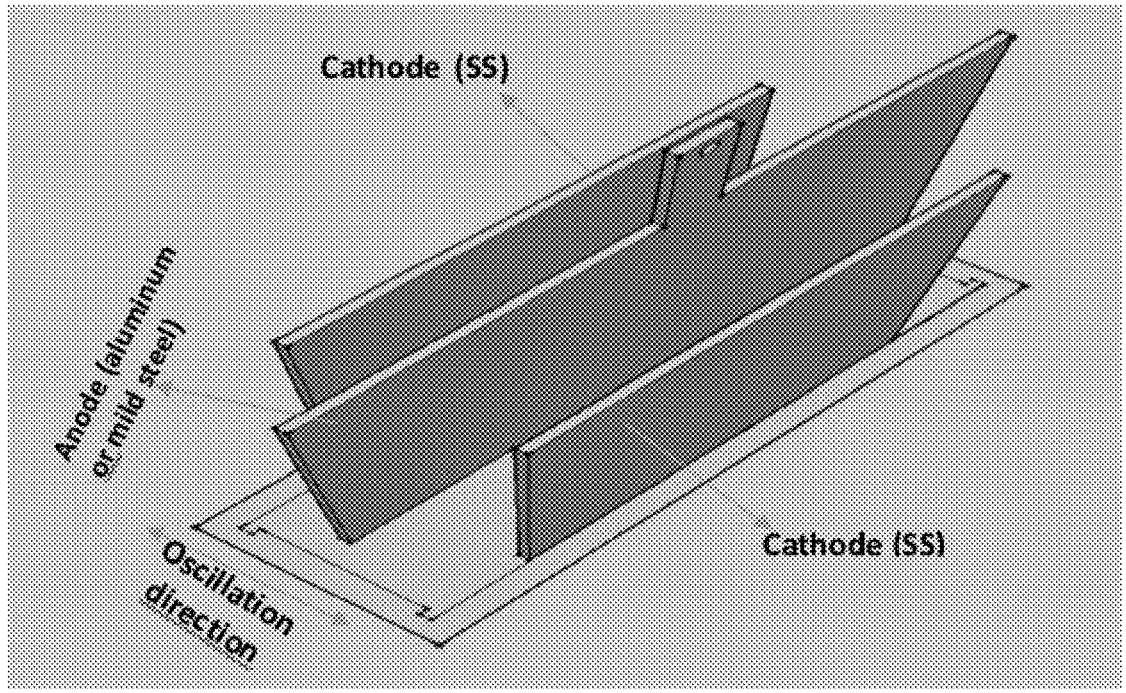
FIG. 5: Model of Plates in the Flat Plates Cell.

This cell, illustrated in FIGS. 4 and 5, makes use of three flat plates. The cathodes are made of stainless steel to prevent corrosion. The anode used was either aluminum (grade 6061) or mild carbon steel (grade 1018), as typically used for electrocoagulation. The cell was constructed in order to allow the anode to oscillate between the cathodes as illustrated in FIG. 5.

Figure 6:
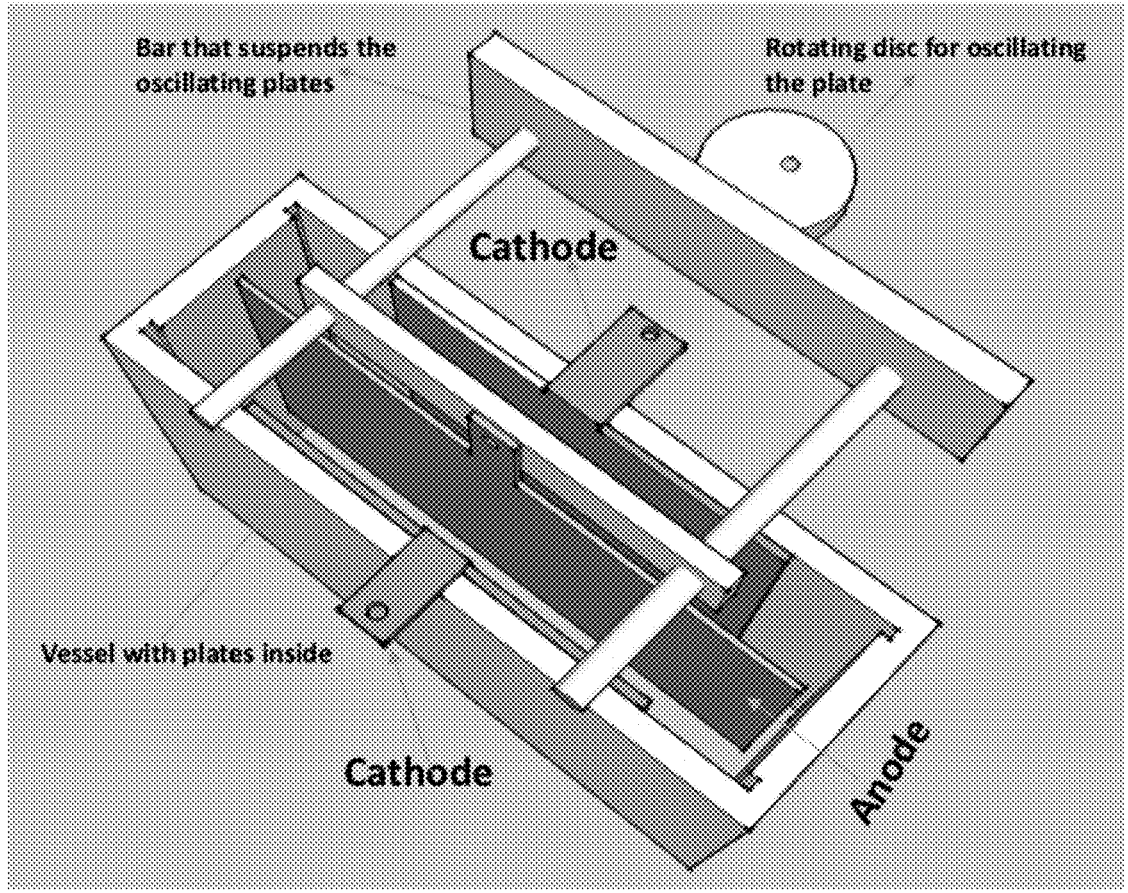
FIG. 6: Full model of the Flat Plates Cell.

All the three plates were rectangular with necks adjoining the plates in order to connect wires. The cathodes had dimensions of height 15.7 cm, width 10 cm, and thickness 2 mm. The anode had dimensions of height 10 cm, width 13 cm, and thickness 1.8 mm. The difference in thickness for the anode and the cathodes was based on the materials that were available at the Engineering building's machine shop, as the cell was constructed there. The anode had a different height compared to the cathodes because its bottom could not touch the base of the vessel (the bottom of the cathodes were touching the base of the vessel) in order to allow oscillations. The greater width of the anode compared to the cathodes allowed more contact with the water during oscillations, thus better convection. The volume of water treated was 400 mL. The anode plate was thus suspended on a bar, which was adjacent to a disc attached to a motor. The disc attached has a slight offset such that as it rotates, the bar and the anode plate will oscillate back and forth. The stationary plates had a gap of 2.2 cm, between which was suspended the anode. The full model is as shown in FIG. 6. The vessel is made of non-conductive material, in this case plexi-glass. This cell was used with monopolar configuration.

Corrugated Plate Cell

Figure 7:
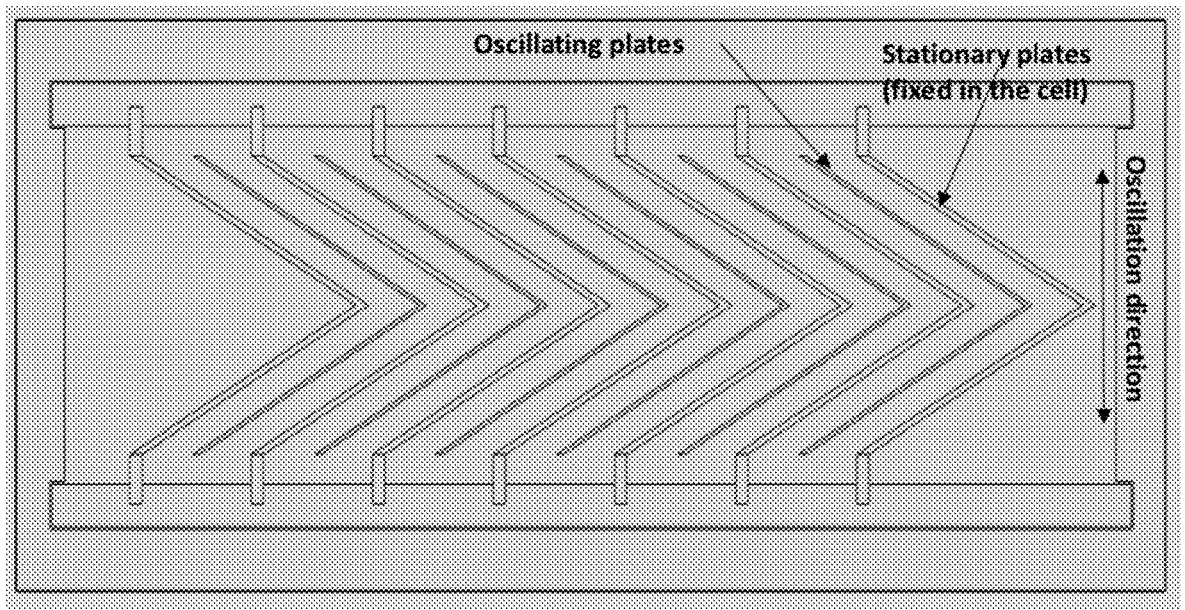
FIG. 7: Cross Sectional View of the Corrugated Plates Cell.

A cell with 13 V-shaped plates was constructed to test the performance of a novel oscillating plate electrocoagulation cell, which can also be used with bipolar configuration. With a flat plate cell the cell voltage will not be reduced by oscillation (in the direction of current flow) in the bipolar configuration. With the corrugated design combined with oscillation perpendicular to the direction of current flow, in principle a reduction of cell voltage should be possible. The cell could be connected in either monopolar or bipolar configuration. FIG. 7 shows a cross sectional view of the cell design.

Figure 8:
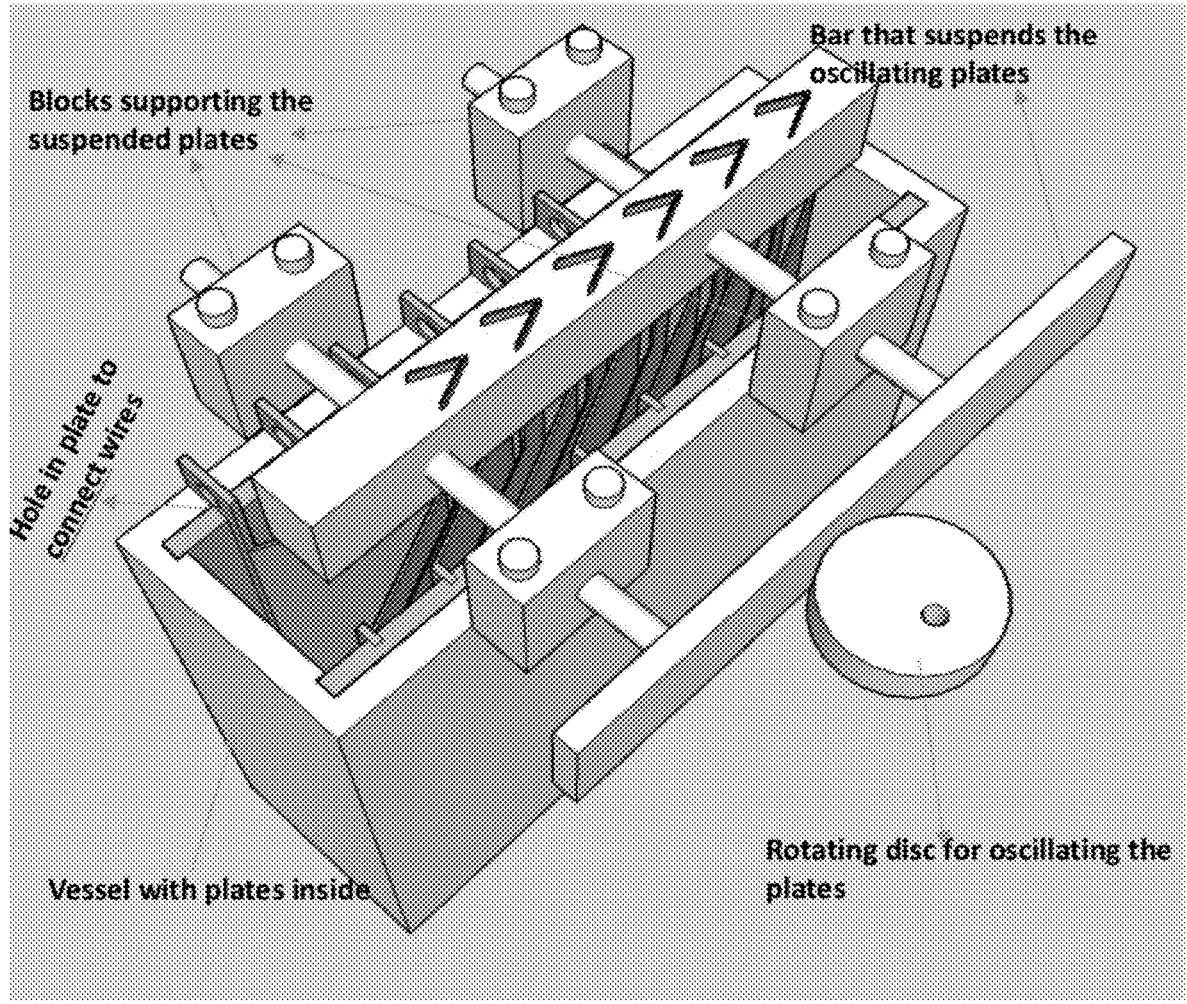
FIG. 8: Full Model of the Corrugated Plates Cell.

As shown in FIG. 7, there are 7 plates that are fixed into slots in the sides of the vessel. Also there are 6 plates, which can be oscillated between the seven stationary plates. Similar to the flat plate cell, the plates that can be oscillated are suspended on a horizontal bar that is adjacent to a disc, which on rotation, will oscillate the plates. The volume of the water treated in this cell is also 400 mL. Both the stationary and the oscillating plates were bent at 49°. The stationary and the oscillating plates were symmetrical. For the stationary plates, each plate had a height of 13.5 cm and the width beside the bend was 3.6 cm (i.e. distance from the outer edge to the bend). The thickness of the stationary plate was 1.8 mm. For the oscillating plate, the height was 13.2 cm, and the width beside the bend was also 3.6 cm. The distance (in the oscillating direction shown in FIG. 6) between two stationary plates was 7.3 mm. The full 3D model of this cell with the plates and the vessel is illustrated in FIG. 8.

EXAMPLES

Analytical Methods

The following instruments were used to analyse samples of water before and after treatment.

Turbidity meter: Turbidity is a measure of the clarity of the water. Water loses clarity or becomes cloudy due to the presence of colloidal particles such as clay, silt, microbial organisms, organics, etc. These cause the passage of light to be scattered as it travels through the water. A turbidity meter is a nephelometric instrument, which measures the degree of the reduction in light transmitted through the sample as compared to a clear blank standard (Reynolds & Richards, 1996). The turbidity meter used for the analysis was VWR 800. The instrument was calibrated using triple filtered reverse osmosis (RO) water as the blank standard. Detection limit is 0-199.9 NTU and accuracy ±2% or 0.50 NTU (whichever is greater).

Inductively Coupled Plasma-Atomic Emissions Spectroscopy (ICP-AES): ICP was utilized to determine the metal concentration of the iron or aluminum electrodissolved. ICP utilizes a plasma generated at 6000 K to 8000 K (America Water Works Association, 1998), temperatures at which the elements in the sample gets converted to ions and is excited, producing an emission spectra. The metal concentration is then determined from the intensity of the emission (America Water Works Association, 1998).

The ICP used for the analysis was an IRIS Intrepid IIXDL, ThermoInstruments Canada Inc. For calibration, a solution was prepared with 30 ppm aluminum and 100 ppm iron using ICP standard solutions of 1000 ppm (from Sigma Aldrich) by diluting with RO water.

Experimental Procedure

The experimental procedure for the fine solids removal and ICP measurements will be discussed in this section.

Fines Removal Examples

Figure 9:
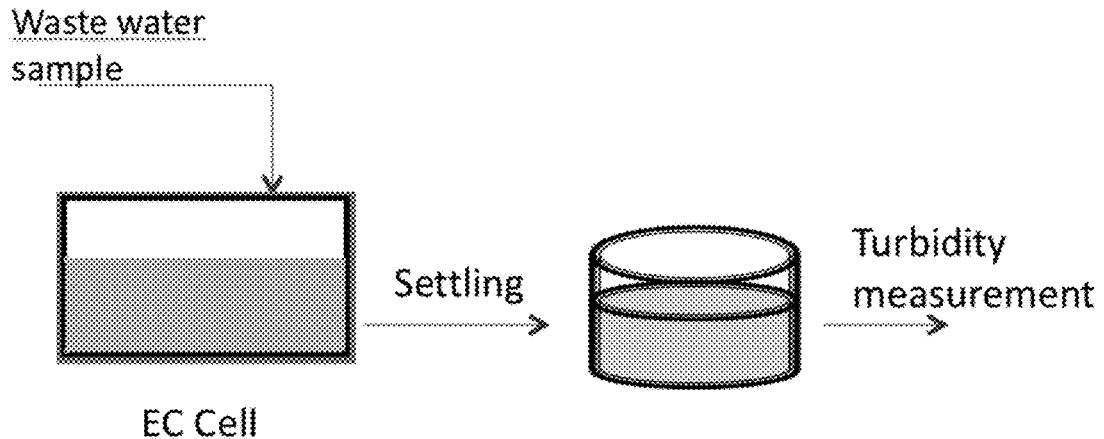
FIG. 9: Experimental Procedure for Turbidity Removal by EC.

For the fines removal Examples, EC was performed to test the removal of kaolin clay as the model for the fine suspended solids in tailings water. Kaolin clay (Sigma Aldrich) at a concentration of 1 g/L was dispersed in tap water to simulate the fine clay particles in tailings water. Tap water was used due to its higher conductivity and because it provides better dispersion of the clay particles. To further increase the dispersion in order to make the test more rigorous, the dispersant poly acrylic acid sodium salt was added at 60 mg/L. It was determined that the solids settle significantly slower with the dispersant added, hence the Examples are rigorous because if there is significant settling after electrocoagulation, it is predominantly due to the treatment process and not natural settling. Sodium chloride at 3 g/L was added to increase the conductivity of the solution to lower ohmic resistance of the cell. A fixed current was applied for a timed electrolysis duration to achieve the EC treatment. The volume of the sample treated for each electrolysis experiment was 400 mL. Following electrolysis, the sample was allowed to settle for 20 minutes in a 1000 mL beaker. The turbidity of a sample of the clarified liquid following settling was determined to measure the solids removal. FIG. 9 is an illustration of the experimental procedure.

ICP Measurements to Determine Metal Concentrations

In order to determine the rate of dissolution of metal into the treated water, electrolysis Examples were carried out in the absence of kaolin, and the concentration of metal in solution was measured as a function of the electrolysis time. Kaolin was not added because the ICP-AES requires the absence of any solids within the liquid and the precipitates have to dissolved by the addition of an acid (typically nitric acid is used for the digestion). As clay is difficult to dissolve, it wasn't included. Hence the initial water prior to electrolysis was composed of 400 mL RO water and sodium chloride at 3 g/L. It is assumed that without kaolin in the water, the amount of metal electrodissolved would be the same as with kaolin in water. Following electrolysis, 2 mL conc. nitric acid was added. For aluminum, the precipitates were fully dissolved. However for the iron, precipitates were still present, but was well dispersed after acid addition (prior to acid addition the precipitates were large clumps). Therefore, 5 mL of the dispersed iron in water mixture was added to 15 mL conc. nitric acid, which formed a clear solution. The sample was then analyzed for metal (Fe or Al) concentrations using the ICP-AES.

Results and Discussion

The results for the Examples conducted on suspended solids removal, cell energy requirement, and metal concentration determination by ICP analysis are set out below.

Flat Plates Cell Results

Examples were conducted with the flat plates cell disclosed herein to test the removal of the fine suspended solids. Kaolin was used to simulate the fine clay particles in tailings water. Turbidity was used to characterise the water quality and the removal of suspended solids. Several types of Examples were conducted to determine the best experimental conditions. Two different anode materials were tested aluminum and iron (as steel) and the respective performances were compared. For the two anode materials, the performance of the cell using an oscillating anode was compared to the performance with a stationary anode. In addition, the turbidity removal performance was investigated at two different current densities while maintaining the charged passed by proportionally adjusting the electrolysis duration. Examples were also conducted with the flat plates cell to test the impact of initial pH on turbidity removal. These Examples were conducted with both aluminum and iron anodes.

Electrode Material

This section includes results comparing the performance of aluminum anode and steel anode to determine whether aluminum or iron based electrocoagulation is more effective for removal of fine clay particles. Examples were conducted with the synthetic wastewater with compositions described herein.

The initial pH of the wastewater was set at 4.5. The electrolysis was carried out at a current density of 0.5 mA cm$^{-2}$. These two parameters were selected as they were seen in the literature (Canizares et al., 2007), which also looked at treating kaolin contaminated water. This stage was the starting point of the research, hence, this literature was selected to prepare an appropriate wastewater sample and also to select a current density. The synthetic wastewater prepared had the same concentrations of kaolin and sodium chloride as (Canizares et al., 2007), however, the synthetic wastewater sample they prepared did not have any dispersants present. Following electrolysis, the flocculated sample was allowed to settle for 20 minutes (this duration was also selected from Canizares, et al., 2007). The pH of the sample was also measured following electrolysis.

Figure 10:
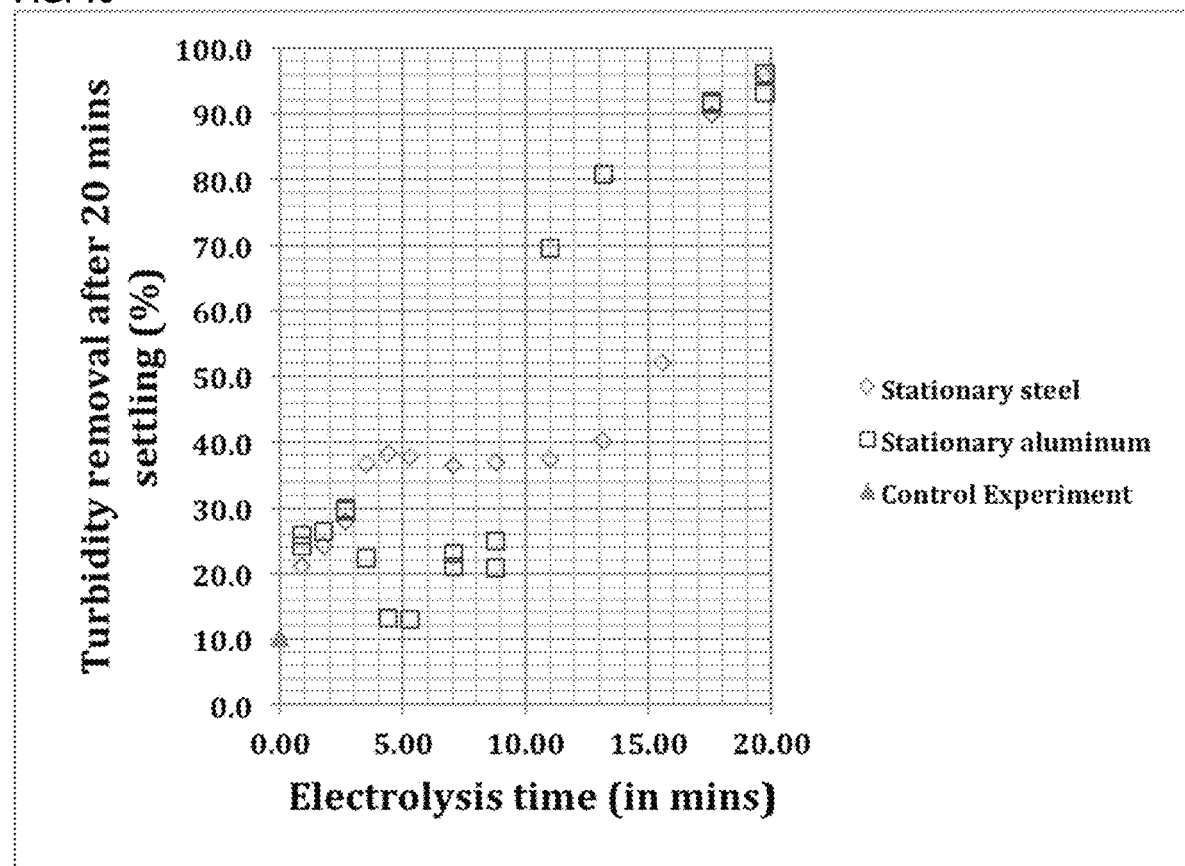
FIG. 10: Effect of electrolysis duration and electrode material on turbidity removal by electrocoagulation, for a kaolin suspension. Solution volume 400 mL, initial pH 4.5, average initial turbidity range 290 NTU, current density 0.5 mA cm-2. Turbidity removal was determined by measuring the turbidity of the treated water after allowing 20 minutes settling. Error bars based on standard deviation.
Figure 11:
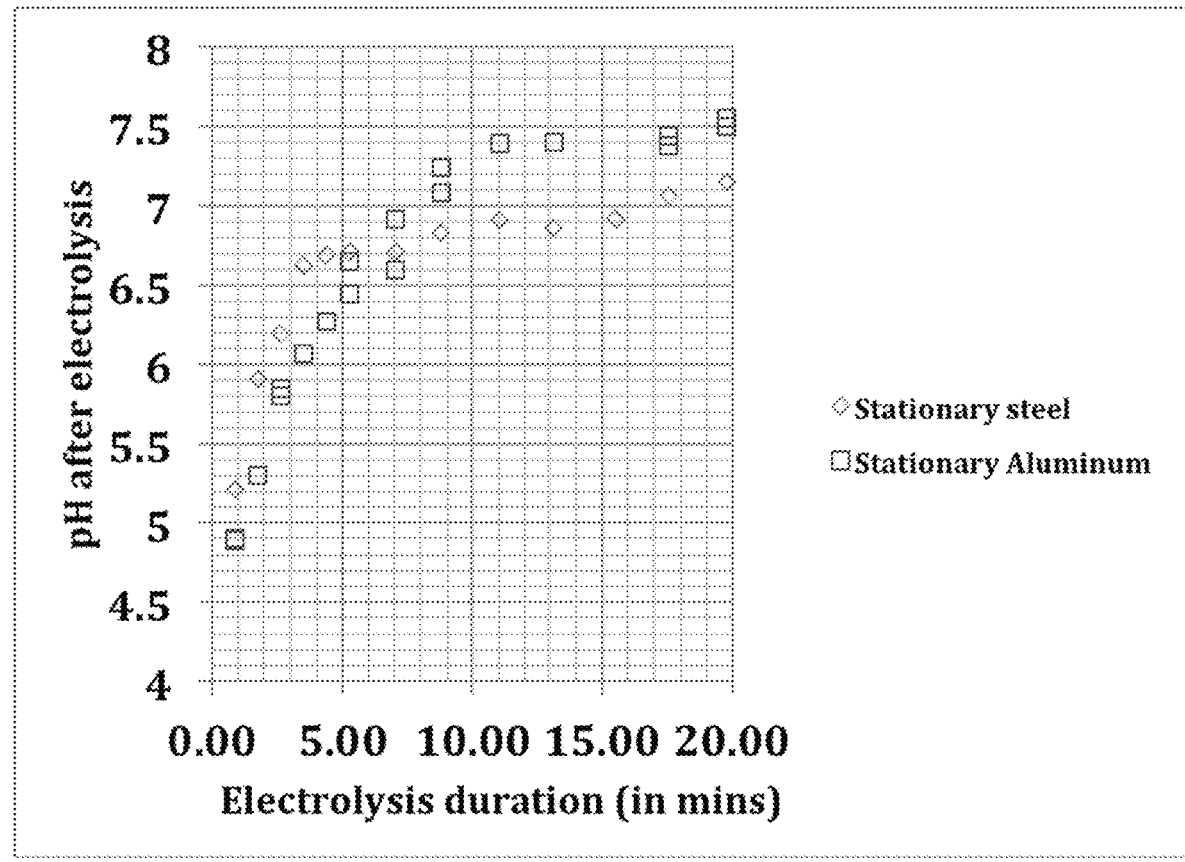
FIG. 11: Effect of electrolysis duration on the pH for FIG. 9. Solution volume 400 mL, initial pH 4.5, current density 0.5 mA cm-2. pH was measured after electrolysis. Error bars based on standard deviation.

FIG. 10 compares the treatment performance of electrocoagulation using a stationary aluminum and steel (iron) electrode with repeat Examples for some conditions to demonstrate reproducibility. FIG. 11 compares the pH after electrolysis for the two anode materials for the same set of Examples in FIG. 10. The results of the repeated Examples shown in FIGS. 10 and 11 show that the removal and the pH was reproducible on an average of 6% for turbidity removals and 2% for pH after electrolysis. In FIG. 10, data is also plotted for a control experiment performed to validate the effect of electrolysis on the flocculation of suspended solids after settling for 20 minutes. For this control experiment, the wastewater sample prepared did not undergo electrolysis in the electrocoagulation cell, but was allowed to settle for 20 minutes. The settling took place in the 1 L beaker that was used for the settling of the samples after electrocoagulation. This control experiment is shown in FIG. 10 as the turbidity removal for an electrolysis duration of zero minutes. The solids removal in this case was about 10%. Each point in FIG. 10 is a separate experiment.

Clearly from FIG. 10 with increasing electrolysis durations, the turbidity removals of the flocculated sample following electrolysis increased. At 0 minutes of electrolysis of the control sample, the turbidity removal was only about 10%, while at the highest electrolysis duration tested of approximately 20 minutes, the turbidity removal after 20 minutes settling was over 95%. This indicated that EC had an effect on turbidity removals because it led to the destabilization of the suspended kaolin particles, so they could be readily settled from the treated water. As the duration of current increases, more metal is electrodissolved and more hydroxide ions generated at the cathode, thus more coagulant is added by hydrolysis, explaining the increased turbidity removals.

FIG. 10 illustrates the effect of electrolysis duration and electrode material on turbidity removal by electrocoagulation, for a kaolin suspension. Solution volume 400 mL, initial pH 4.5, average initial turbidity range 290 NTU, current density 0.5 mA cm$^{-2}$. Turbidity removal was determined by measuring the turbidity of the treated water after allowing 20 minutes settling. Repeat Examples for some conditions demonstrate the reproducibility of the Examples.

FIG. 11 illustrates the effect of electrolysis duration on the pH for FIG. 10. Solution volume 400 mL, initial pH 4.5, current density 0.5 mA cm$^{-2}$. pH was measured after electrolysis. Repeat Examples for some conditions demonstrate the reproducibility of the Examples.

Another important observation is that the pH of the samples after electrolysis shown in FIG. 11, at electrolysis durations of over 5 minutes, which showed rapidly increasing turbidity removals (FIG. 10), the pH after electrolysis was greater than 6.5 and less than 8.0. This indicates that for these conditions, the predominant coagulation/flocculation mechanism was sweep flocculation as mentioned in the "Introduction" section.

Comparing the removal performance between iron and aluminum anodes shown in FIG. 10, both electrode materials exhibited maximum removals after 20 minutes of electrolysis. However, in most cases aluminum was observed to generate better turbidity removal performance at the sweep flocculation stage of electrolysis durations over 5 minutes. One explanation is that aluminum hydroxides have better adsorption capacity than iron based. However from FIG. 10, the turbidity removal with a steel anode caught up with aluminum after approximately 17 minutes of electrolysis.

For pH less than 6, the predominant coagulation mechanism is normally considered to be by charge neutralization (Reynolds & Richards, 1996) followed by aggregation by van der Waal's forces. The pH after electrolysis for electrolysis durations less than 5 minutes in FIG. 11 suggests that the removal mechanism at this stage is charge neutralization. This is because at pH less than 6, the metal hydroxy cations formed will neutralize the surface charges and destabilize the suspension. However, with continuous addition of metal ions, there will be an excess of positive charges on the colloidal particles, thus re-stabilizing the suspension. When this happens, the removals will decrease from the initial peak in removals. This is clearly seen in FIG. 10, with the case of aluminum being more evident. When the charges are neutralized completely, the zeta potential which is a parameter that quantifies the charges present will be 0, unlike when the suspension is stable with negative charges, at which the zeta potential will have significantly negative values (Reynolds & Richards, 1996).

For EC using both aluminum and iron anodes, the pH increased with increase in electrolysis durations. Hydrolysis reaction of the metal ion generated at the anode would decrease the pH. However, a net increase in the pH would suggest that hydroxide ions from the cathode are being generated at a faster rate than the hydroxide ions being consumed by hydrolysis of the metal ions generated at the anode. This is different from the conventional chemical coagulation which has a net decrease in the pH as more of the metal salt coagulant is added. Thus in order to maintain the pH in the sweep flocculation stage and to prevent the pH from dropping below 6, more lime has to be added. Hence, the resulting volume of sludge is much larger. This could possible explain the previous studies that have indicated that EC produces lower sludge volumes than chemical coagulation (Liu et al., 2010; Zhu et al., 2005). The hydroxide ions/alkalinity required in EC is provided by a cathodic reduction reaction that does not involve the generation of any metal ions, in contrast to chemical coagulation where the calcium added with the lime contributes to the sludge produced.

Comparing Oscillating Anode v's Stationary Anode

The concept of an oscillating anode in electrocoagulation is a novel one. Though, there is a patent (Khamelsky et al., 2000) describing it with data that shows improved performance, there have been no published studies of this effect. Besides, this patent looked at examining heavy metal removal. The concept of an oscillating anode for the removal of fine particles has not been tested. It is proposed that an oscillating anode could improve fine solids removals by EC. All the Examples discussed in section 3.1 were carried out with stationary anodes. For the same set of electrolysis durations, the performance of oscillating anodes was tested and compared. The composition of the wastewater prepared was the same. The current density was also set at 0.5 mA cm$^{-2}$. The initial pH of the sample was 4.5. EC using both an aluminum and a steel anode were tested. Following electrolysis, the sample was allowed to settle for 20 minutes. The pH of the sample was measured just after electrolysis, similar to the procedure for the stationary case. The oscillation of the anode was at a frequency of 0.23 Hz (the disc was rotating at 14 RPM) and the peak to peak amplitude was 16.2 mm (the stationary cathodes had a distance of 21.6 mm, and so this amplitude allowed the anode to approach either of the cathodes at a close proximity while avoid touching each other and short circuiting).

Figure 12:
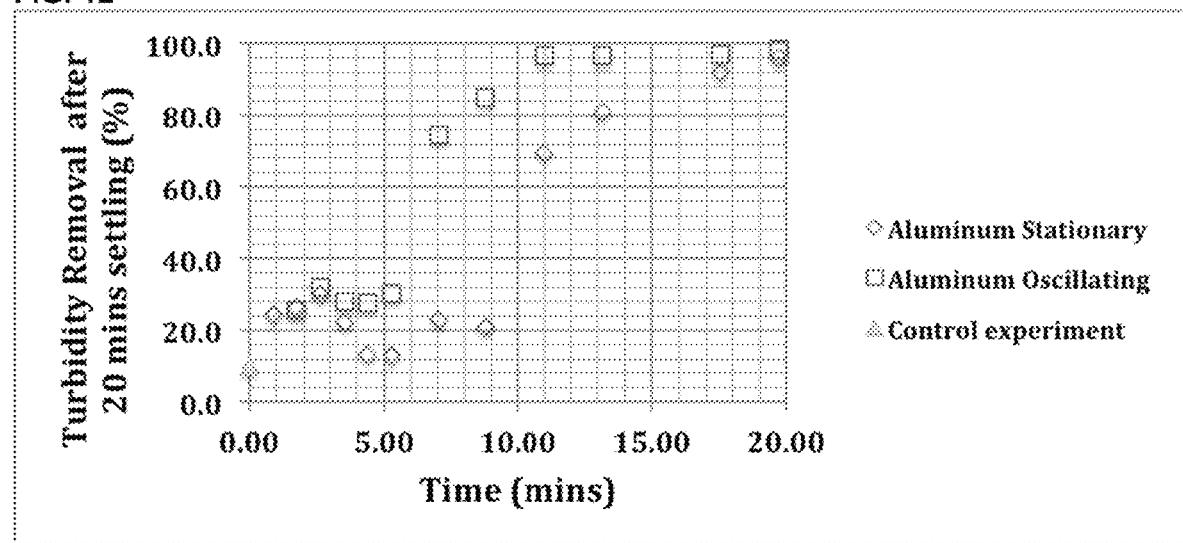
FIG. 12: Effect of electrolysis duration and stationary vs oscillations with aluminum anode on turbidity removal by electrocoagulation, for a kaolin suspension. Solution volume 400 mL, initial pH 4.5, average initial turbidity 290 NTU, current density 0.5 mA cm-2. Turbidity removal was measured after treated sample was allowed to settle for 20 minutes.

The results of the turbidity removals by EC for the case of a stationary and oscillating aluminum anode are plotted as a function of electrolysis duration in FIG. 12. The pH measured after electrolysis for the same Examples is plotted in FIG. 13. Clearly, from FIG. 12, for the case of oscillations, turbidity removals increased with increasing electrolysis durations. However, the main conclusion from the results is that oscillations were able to significantly reduce the treatment duration. It took only 11 minutes for the case with an oscillating anode to achieve the highest turbidity removal of over 96% while for the case with a stationary anode it took 20 minutes to reach the maximum removal.

FIG. 12 illustrates the effect of electrolysis duration and stationary vs oscillations with aluminum anode on turbidity removal by electrocoagulation, for a kaolin suspension. Solution volume 400 mL, initial pH 4.5, average initial turbidity 290 NTU, current density 0.5 mA cm$^{-2}$. Turbidity removal was measured after treated sample was allowed to settle for 20 minutes.

Figure 13:
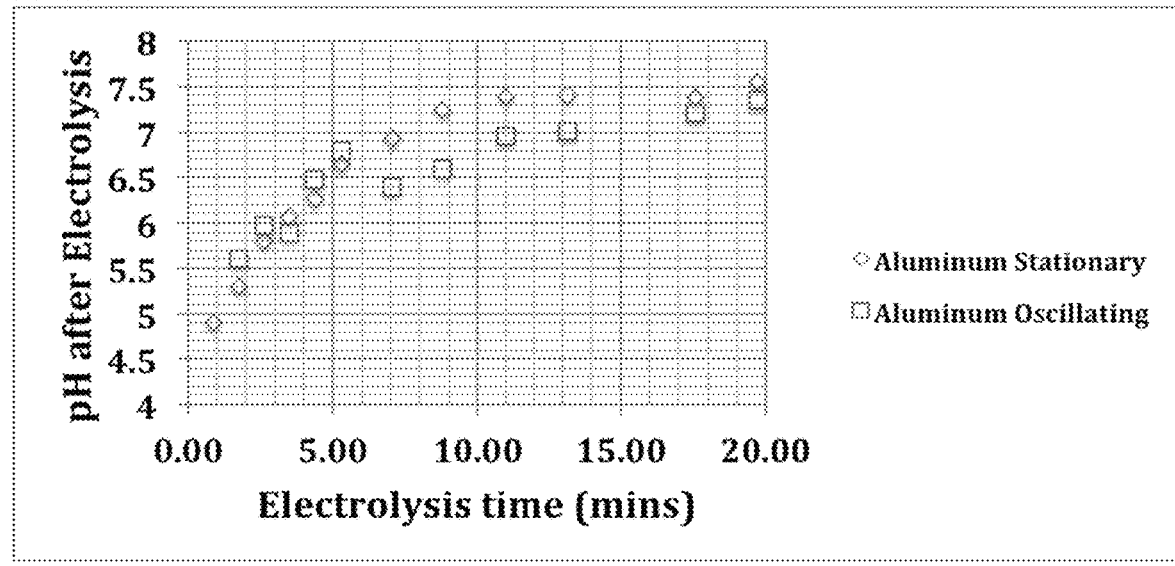
FIG. 13: Effect of electrolysis duration on the pH for FIG. 11, Solution volume 400 mL, initial pH 4.5, current density 0.5 mA cm-2. pH was measured after electrolysis.

FIG. 13 illustrates the effect of electrolysis duration on the pH for FIG. 12, Solution volume 400 mL, initial pH 4.5, current density 0.5 mA cm$^{-2}$. pH was measured after electrolysis.

Oscillations thus reduced the treatment duration by 44% for the case of aluminum anode at constant current density. By reducing the treatment duration, if this technology is to be implemented for a continuous treatment operation, the retention time can be reduced. Moreover, by introducing oscillations to reduced treatment duration, the cell's electrochemical energy can be reduced, as electrical energy consumed=$\int V\, I\, dt$, where V is the cell potential (V), I is the cell current passed (A), and t is electrolysis duration (s).

Therefore, the use of an oscillating anode demonstrably improves turbidity removal by EC. It is expected that oscillations improve the mass transport conditions as the convection would lead to faster hydrolysis of ions, aggregation of the metal hydroxy cations, metal hydroxyl precipitates, and the contaminants, in this case the colloidal clay particles. Moreover, the influence of the electric field is important. By allowing the anode plate to approach closer to one of the cathode plates, the electric field at this stage between the pair of plates is stronger than the case with the anode stationary with greater distance between the anode-cathode pair. With stronger electric field, there were will be greater transport of colloidal particles by electrophoresis, and the hydroxide production will occur close to the anode where metal ions are dissolving.

From FIG. 12, for both cases, the stationary as well as the oscillating anode, at first there is a gradual increase in the turbidity removals followed by a dip before the turbidity removals increases dramatically to the maximum removals. This can be attributed to the removal mechanism which follows the sequence of charge neutralization followed by destabilization of the suspension, which is followed by re-stabilization of the suspension, and finally the last step which is removal by sweep flocculation. For both the stationary and the oscillating case, the initial peak occurs under 3 minutes. From FIG. 13, the pH for this is under 6, clearly indicating that charge neutralization is the main mechanism up to this point. However, with the continuous addition of the metal, there will be the excess of positive charges on the particles, and this causes the suspension to be re-stabilized and the particles once again will start repelling each other and thus preventing aggregation, hence the removal started to decrease after the peak in FIG. 12. With further addition of the metal and with the simultaneous increase in pH due to the generation of the hydroxide ions at the cathode, the conditions were favorable for the generation of aluminum hydroxide precipitates. With electrolysis durations over 5 minutes, the pH was well over 6 in FIG. 13, indicating the formation of precipitates, which would cause sweep flocculation. After this stage the turbidity removals started to increase dramatically. The mentioned literature which utilized the similar suspension (Canizares, et al., 2007), also had two peaks in the turbidity removal plots clearly indicating charge neutralization and sweep flocculation, although the removal by charge neutralization was much higher in that literature.

Another aspect of select embodiments is the oscillating nature of the current from the anode. As the anode electrode moves closer to one of the two cathodes, the ohmic resistance between that pair lowers while the ohmic resistance between the anode and the other cathode will increase significantly. Hence most of the current will originate from the faces closer to each other, causing larger electrodissolution of the metal ion between that anode-cathode pair, while significantly lower electrodissolution from the other face. When the anode swings the other way, the face closer to the other electrode will experience more electrodissolution. Therefore, as this process continues, there is a continuous dynamic pulsing of current with greater concentrations of metal ions being generated at one anode-cathode pair in one cycle which may intensify the coagulation/flocculation process.

From the data plotted in FIG. 13, the pH after electrolysis plot shows that in most cases for the oscillating anode a pH greater than 6 was obtained especially at the higher electrolysis durations that yielded the highest turbidity removals, indicating that sweep flocculation or aggregation onto aluminum hydroxide precipitates is the main removal mechanism as with the stationary electrodes. In the oscillating case, for electrolysis durations of 7 minutes and greater, a lower pH was observed compared to that obtained for the stationary case, which may be taken to indicate oscillations lead to faster hydrolysis reactions. In fact, the pH plot also showed that at about the 5-minute mark and beyond, the pH for the oscillating case started to decrease compared to the cases at lower electrolysis durations. From the turbidity removals plot, at the mentioned electrolysis durations of 5 minutes and beyond, the turbidity removals started to increase dramatically. This indicates as well that oscillations lead to faster hydrolysis reactions because of the decrease in pH. The turbidity removals shown in FIG. 12 under these conditions (electrolysis durations of 7 minutes and greater), show an enhanced removal compared to the stationary case, further strengthening the argument that oscillations lead to faster hydrolysis, and so flocculating at a faster rate.

For the case of steel, Examples with an oscillating anode were conducted to compare to the case of a stationary anode.

Examples were carried out with the same set of electrolysis durations conducted at 0.5 mA/cm$^2$ as described above for an aluminium anode. The turbidity removal is plotted as a function of electrolysis duration in FIG. 14, comparing the oscillating and stationary cases, and the pH measured after electrolysis is shown in FIG. 15.

Unlike aluminum, which formed a clear suspension following electrolysis, the steel electrode was observed to introduce color into the solution, either orange or blue, depending on the operating conditions. It was noticed that at lower electrolysis durations, the color was orange, suggesting the presence of ferric iron, Fe(III).

Figure 14:
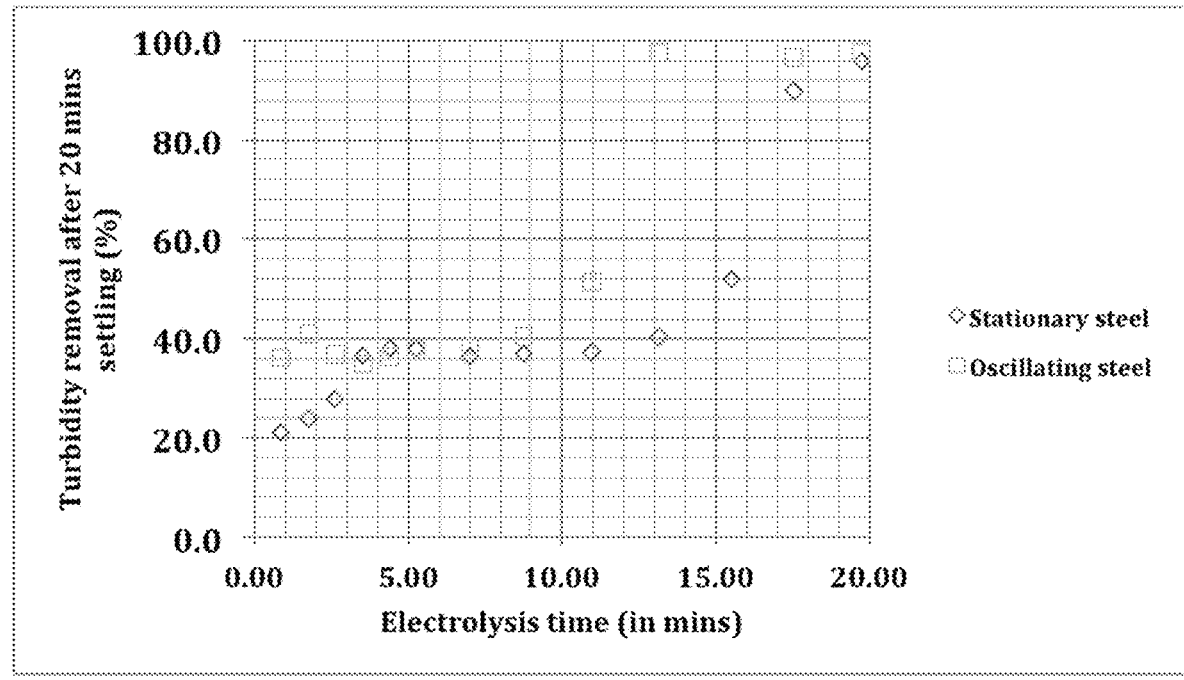
FIG. 14: Effect of electrolysis duration and stationary vs oscillations with steel anode on turbidity removal by electrocoagulation, for a kaolin suspension. Solution volume 400 mL, initial pH 4.5, average initial turbidity 290 NTU, current density 0.5 mA cm-2. Turbidity removal was measured after treated sample was allowed to settle for 20 minutes.

FIG. 14 illustrates the effect of electrolysis duration and stationary vs oscillations with steel anode on turbidity removal by electrocoagulation, for a kaolin suspension. Solution volume 400 mL, initial pH 4.5, average initial turbidity 290 NTU, current density 0.5 mA cm$^{-2}$. Turbidity removal was measured after treated sample was allowed to settle for 20 minutes.

Figure 15:
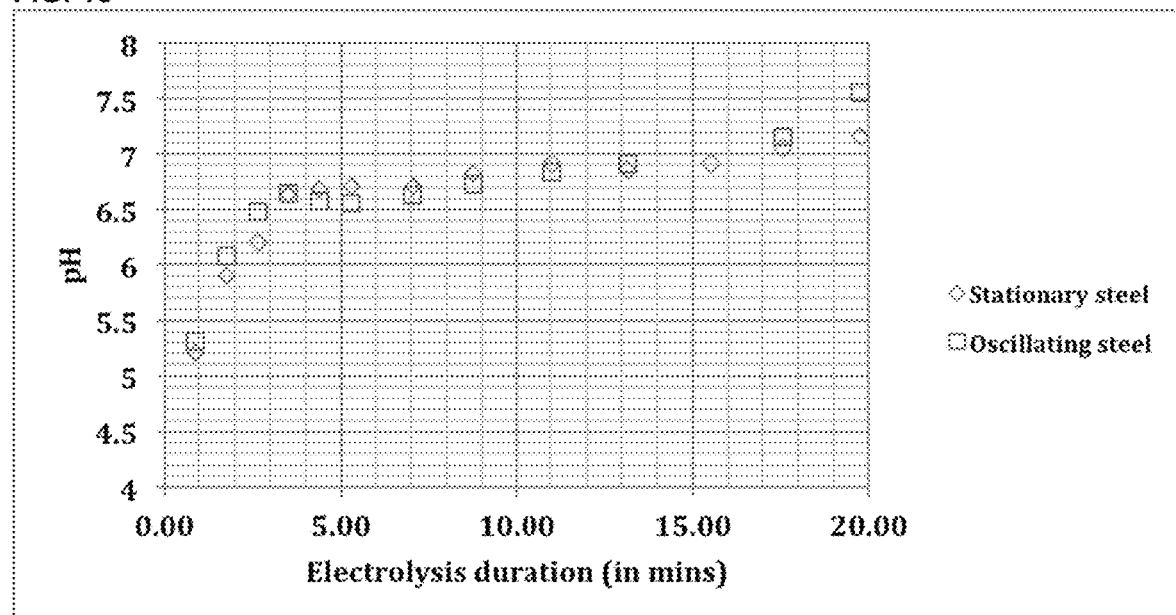
FIG. 15: Effect of electrolysis duration on the pH for FIG. 13, Solution volume 400 mL, initial pH 4.5, current density 0.5 mA cm-2. pH was measured after electrolysis.

FIG. 15 illustrates the effect of electrolysis duration on the pH for FIG. 14, Solution volume 400 mL, initial pH 4.5, current density 0.5 mA cm$^{-2}$. pH was measured after electrolysis.

For long electrolysis durations, especially the case with the oscillations, the color generated was dark blue, suggestive of ferrous iron, Fe (II). It can be speculated that the orange color forms due to predominantly ferric ions while the blue color is due to ferrous ions.

As with the aluminium anode, the turbidity removal observed with an oscillating iron anode was higher than that observed with a stationary iron anode. For the case of iron, the oscillating anode reduced the treatment duration by 33%, from around 20 min to 13 min for ca. 95% turbidity removal. Therefore, the fact that oscillations may be arranged so as to improve turbidity removal by EC has been demonstrated for an iron anode as well as for aluminium. Hence, for the case of iron, the reduced treatment duration is likely to yield lower electrochemical energy requirement as well as reduced retention time, if implemented on a large scale as a continuous treatment process. The explanation for the improved performance with oscillations may be the enhanced mixing and pulsed current as with the aluminum anode. By oscillating the anode, the electric field between an anode-cathode pair is significantly stronger, and by electrophoresis, the flocculation process is significantly improved. As discussed earlier, the dynamic pulsing of current from the two faces of the anode plate changing in each cycle, causing significantly more electrodissolution from one face per cycle, thus intensifying the flocculation process.

From the pH after electrolysis, most of the Examples, especially those which showed very high removal rates, show a pH after electrolysis between 6 and 8, indicating that most of the removals occur by sweep flocculation, i.e. turbidity removals by adsorption onto iron hydroxide precipitates. However, unlike the case with the aluminum, for this case, the trend in pH increase with increasing electrolysis duration was quite similar for both the oscillating and the stationary case. For aluminum, the pH after electrolysis typically was lower for the oscillating case, for a given duration, suggesting that hydrolysis was occurring at a faster rate for the oscillating case.

If FIGS. 12 and 14 are compared, the stationary anode case of both metals show that the highest removals of ca. 95% occurred at about 20 minutes. However, if the oscillating cases are compared, clearly the aluminum anode performs better than the iron/steel anode. The aluminum anode was able to achieve a removal of ca. 95% at about 11 minutes of electrolysis, while the steel anode only achieved ca. 95% removal after 13 minutes of electrolysis. A possible explanation for this difference could be that for this particular contaminant, kaolin, aluminum hydroxides have better adsorptive capacity for kaolin, thus explaining the higher rates of removals. In fact, even for the case of stationary, though the maximum removals take place at similar durations between the materials, for most part, the aluminum anode had better removals than the steel. From the literature (Canizares, et al., 2007) discussed earlier that was used to prepare the synthetic wastewater, it was reported that with the case of aluminum, the suspension after electrolysis achieved a zeta potential of zero faster than the case with the iron. Zeta potential signifies the stability of a colloidal suspension, with more negative the zeta potential, the more stable the colloidal suspension. (Canizares, et al., 2007) also reported that the kaolin contaminated sample is one with a negative zeta potential. If the case with iron achieves zeta potential of zero after aluminum, it could also explain the reason why iron is slower at destabilizing the kaolin contaminated suspension.

Test of Equivalent Dosage at Higher Current Densities

The previous two subsections discussed the differences in performance between iron and aluminum based anodes, and also demonstrated that an oscillating anode would yield better contaminant removals than a stationary anode. This study was carried out by determining the turbidity removals at a fixed current density of 0.5 mA/cm$^2$ by varying the electrolysis durations from under 1 minute to about 20 minutes.

In alternative embodiments, the electrolysis duration may be further decreased while maintaining the same turbidity removals for the same charge passed by increasing the current density. In order to exemplify such embodiments, four Examples were selected with the oscillating case in FIGS. 12 and 14 to investigate the effect of current density. For the selected four points, Examples were conducted such that the current density was four times the case in FIGS. 12 and 14 while the electrolysis durations for these points were proportionally decreased by a factor of 4, therefore maintaining the same amount of metal electrodissolved based on Faraday's Law of Electrolysis. For the case of aluminum from FIG. 12, the cases of electrolysis durations of 8.77 minutes, 11.00 minutes, 13.16 minutes, and 17.55 minutes were tested which corresponds to 0.50 mmol/L, 0.63 mmol/L, 0.75 mmol/L, and 1.00 mmol/L respectively of aluminum electrodissolved assuming 100% current efficiency at the anode. In order to maintain the dose of metal electrodissolved using a current density of 2.0 mA/cm$^2$, the electrolysis durations tested were 2.20 minutes, 2.75 minutes, 3.30 minutes, and 4.38 minutes.

For the case of the steel anode, the set of electrolysis durations tested were 11 minutes, 13.16 minutes, 17.55 minutes, and 19.74 minutes. These durations correspond to 0.63 mmol/L, 0.75 mmol/L, 1.00 mmol/L, and 1.13 mmol/L of iron electrodissolved, assuming 100% current efficiency based on Fe$^{3+}$. To discharge the same amount of metal at the current density of 2.0 mA/cm$^2$, the electrolysis durations tested were proportionally reduced by a fourth and were 2.75 minutes, 3.30 minutes, 4.38 minutes, and 4.88 minutes.

For all the tested cases, the sample prepared had the same composition as in the cases with the lower current density and longer electrolysis durations. The initial pH of the sample was set at 4.5 as before. Following electrolysis, the suspension was allowed to settle for 20 minutes and then the turbidity was measured. Following electrolysis, the pH of the sample was also measured.

Figure 16:
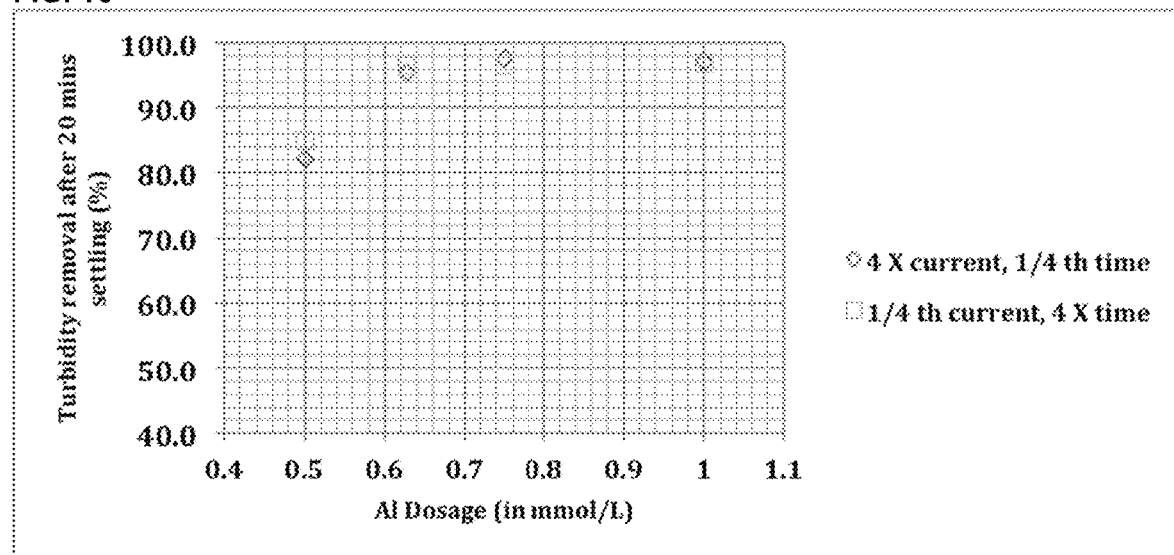
FIG. 16: Comparing turbidity removals aluminum anode- two different current densities and electrolysis durations (4×current means 2 mAcm-2 and ¼th current means 0.5 mA cm-2).
Figure 17:
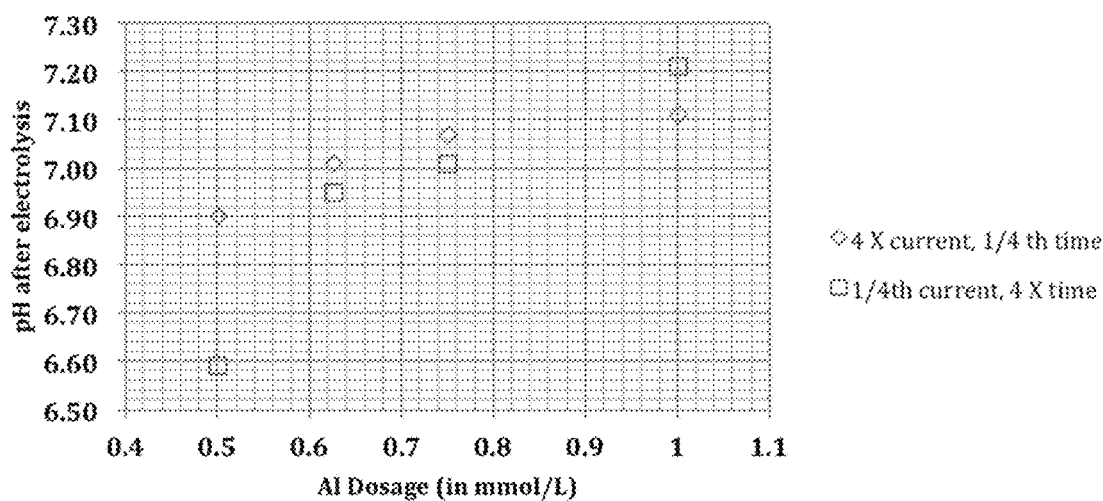
FIG. 17: pH after electrolysis aluminum anode- two different current densities and electrolysis durations for FIG. 15 (4×current means 2 mAcm-2 and ¼th current means 0.5 mA cm-2).
Figure 18:
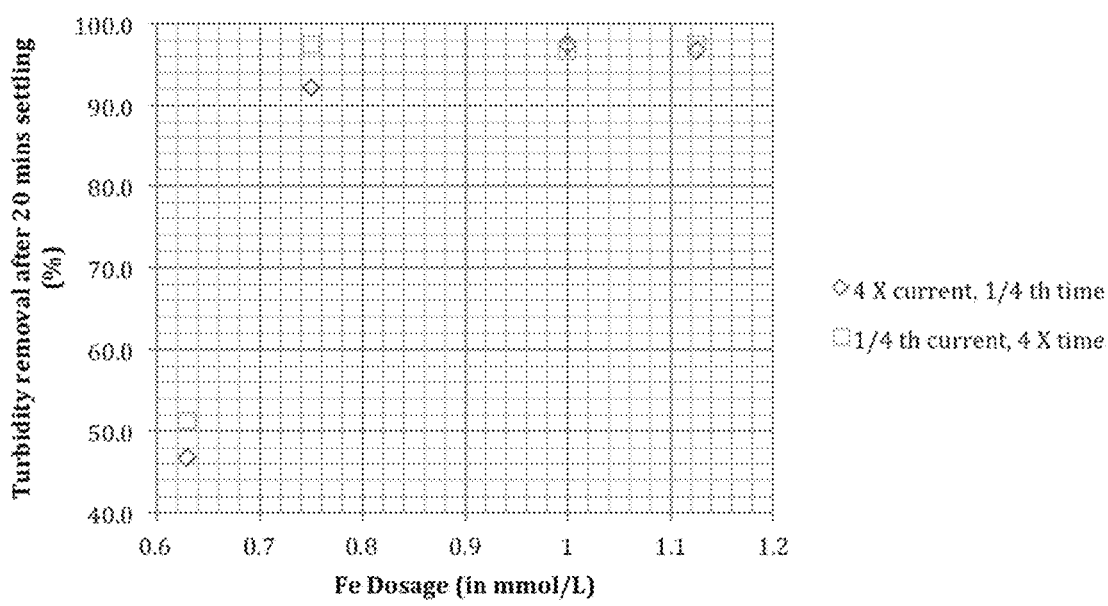
FIG. 18: Comparing turbidity removals steel anode- two different current densities and electrolysis durations (4×current means 2 mAcm-2 and ¼th current means 0.5 mA cm-2).
Figure 19:
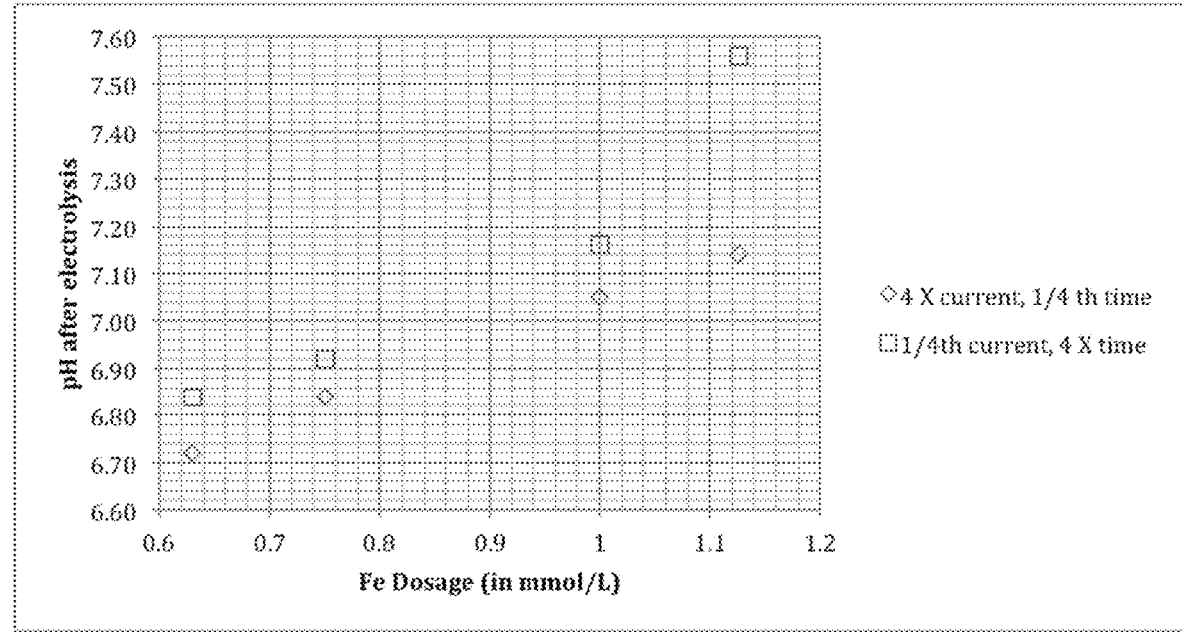
FIG. 19: pH after electrolysis steel anode based on FIG. 17- two different current densities and electrolysis durations (4×current means 2 mAcm-2 and ¼th current means 0.5 mA cm-2).

FIG. 16 shows a plot of the turbidity removals obtained for the aluminum anode as a function of aluminium dose, calculated assuming 100% current efficiency, based on Faraday's Law. The turbidity removals are compared for the two current densities using an oscillating anode. FIG. 17 shows the corresponding pH after electrolysis for the data in FIG. 16. For the steel anode, FIG. 18 shows a plot of the turbidity removal as a function of the electrolysis duration, and FIG. 19 shows the data for the pH after electrolysis.

As seen from the mentioned figures, for both aluminum and iron, the turbidity removal values are very close for the case with the higher current density and proportionally lower electrolysis durations. Therefore, if required, the treatment time can be reduced by a desired factor to meet the required turbidity removals, provided the current density is increased by the same factor. However, the cell voltage will increase as well if the current density is increased, and so the energy consumption increases. On an industrial scale, a reduction in process time could mean lower operating costs. The pH after electrolysis for both iron and aluminum indicate that sweep flocculation is the predominant mechanism. An inference is that despite significantly lesser time available for the hydrolysis reaction and flocculation for the higher current density and proportionally lower electrolysis duration, the turbidity removals remained the same. Hence these electrolysis durations and the settling time are sufficient for the flocculation to come to completion. This indicates that hydrolysis and flocculation reactions are not the rate limiting steps.

Therefore, in order to not be limited by time and to quicken the pace of the Examples, the rest of the Examples in this research were conducted at 2 $mA/cm^2$.

FIG. 16 is a graph comparing turbidity removals aluminum anode-two different current densities and electrolysis durations (4×current means 2 mAcm-2 and ¼th current means 0.5 mA $cm^{-2}$).

FIG. 17 is a graph illustrating pH after electrolysis aluminum anode-two different current densities and electrolysis durations for FIG. 16 (4×current means 2 $mAcm^{-2}$ and $¼^{th}$ current means 0.5 mA $cm^{-2}$).

FIG. 18 is a graph comparing turbidity removals steel anode- two different current densities and electrolysis durations (4×current means 2 $mAcm^{-2}$ and $¼^{th}$ current means 0.5 mA $cm^{-2}$).

FIG. 19 is a graph illustrating pH after electrolysis steel anode based on FIG. 18—two different current densities and electrolysis durations (4×current means 2 $mAcm^{-2}$ and $¼^{th}$ current means 0.5 mA $cm^{-2}$).

Effect of Initial pH

The initial pH of the sample is a very important parameter in treatment by electrocoagulation. As discussed earlier, the pH of the sample determines the type of flocculation that will be predominant. Moreover, for the treatment of real tailings water, the initial pH of the sample is alkaline with a pH of over 7 (Saidi-Mehrabad et al., 2013). The initial pH of the sample in the prior cases were all at 4.5. The formation of sweep flocs would require the pH to be between 6 and 8. However, if the initial pH of real tailings water is basic, tests need to be done to determine the performance of EC at varying pH values, so as to determine whether adjustment of pH is required to optimize the performance.

Figure 21:
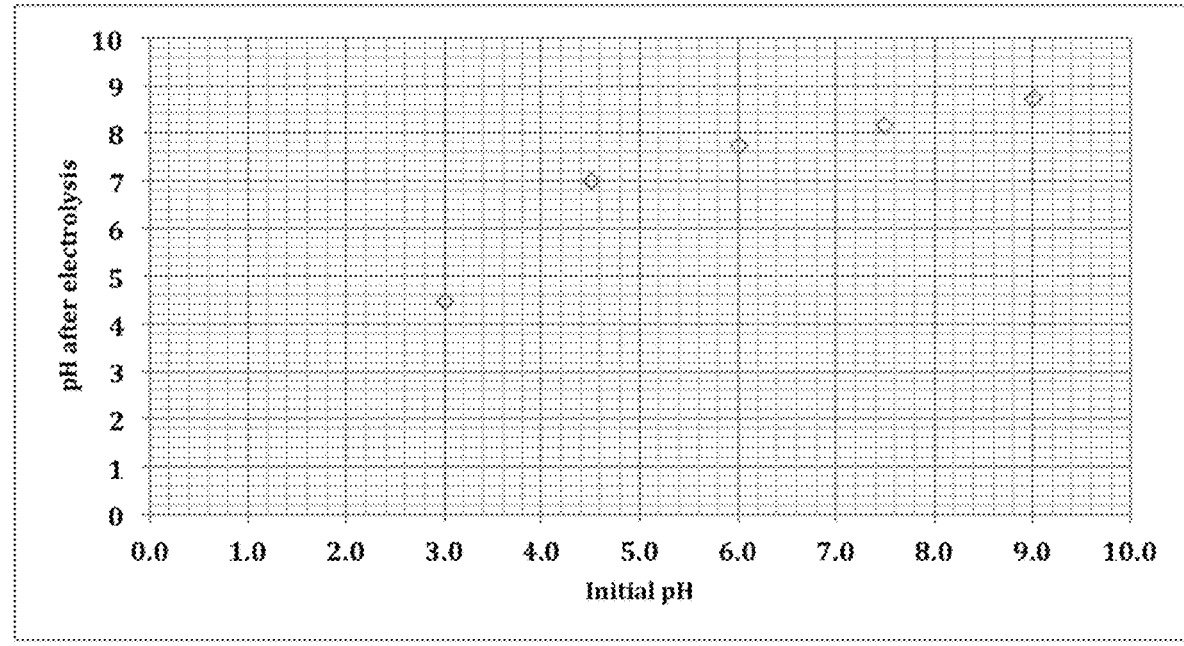
FIG. 21: pH after electrolysis aluminum anode based on FIG. 19.
Figure 22:
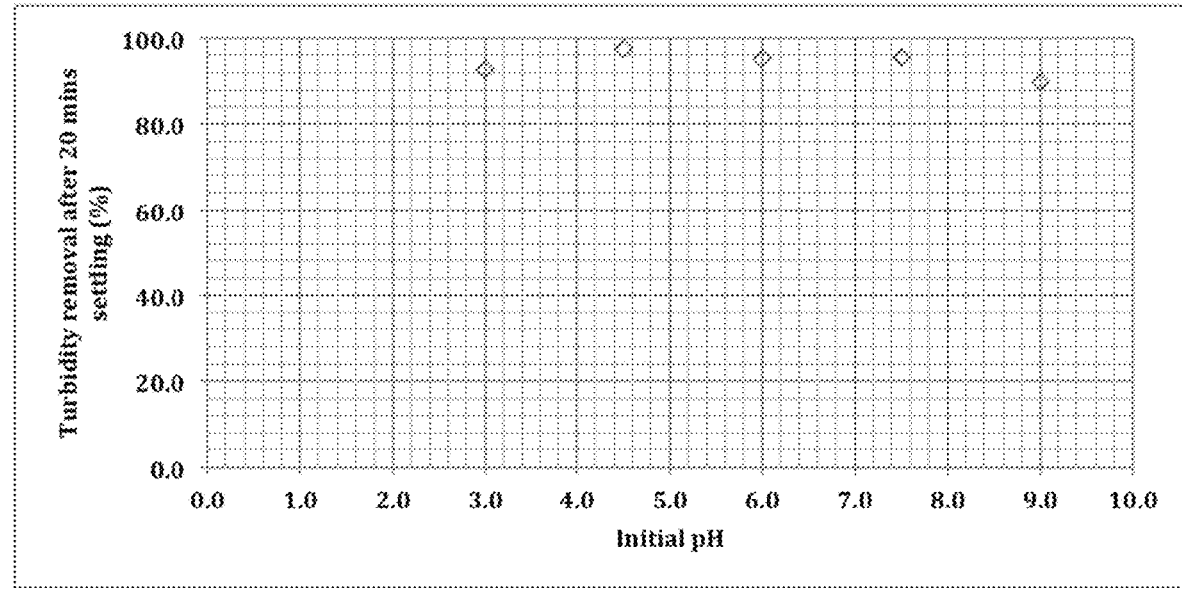
FIG. 22: Effect of initial pH with steel anode on turbidity removal by electrocoagulation, for a kaolin suspension. Solution volume 400 mL, electrolysis duration 4.38 minutes, average initial turbidity 290 NTU, current density 2.0 mA cm-2. Turbidity removal was measured after treated sample was allowed to settle for 20 minutes.

The effect of initial pH on treatment performance was tested for both aluminum and iron/steel anodes. The current density used was 2 $mA/cm^2$, to carry out the electrolysis at short durations. Five different initial pH were analyzed; 3.0, 4.5, 6.0, 7.5, and 9.0, and all cases used an oscillating anode. The electrolysis duration selected for the aluminum anode was 2.75 minutes, because it is the smallest duration at 2 $mA/cm^2$ at pH 4.5 that yields maximum (>90%) turbidity removal (FIG. 16). Similarly for the case with the iron/steel electrode, FIG. 18, the case with oscillation at 2 $mA/cm^2$ achieved the maximum (>90%) removal at a lowest electrolysis duration of 4.38 minutes. The turbidity removal obtained is plotted as a function of initial pH for the case with aluminum in FIG. 20 and the pH after electrolysis is plotted in FIG. 21. For the case with steel electrode, the turbidity removal as a function of initial pH is as seen in FIG. 22 and the pH after electrolysis is plotted in FIG. 23.

Figure 20:
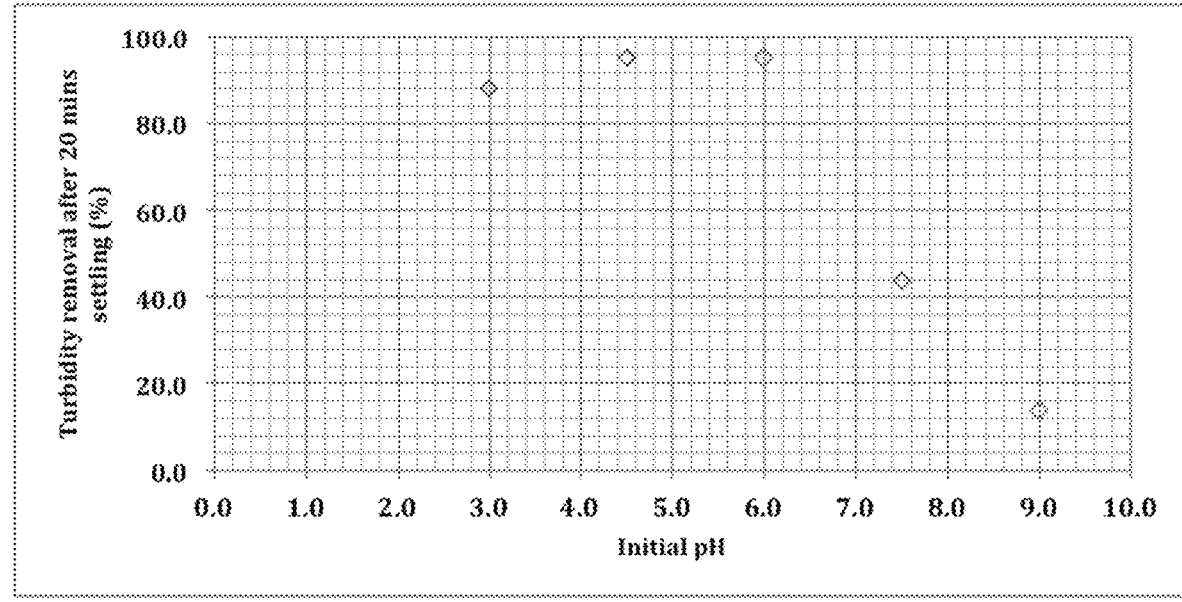
FIG. 20: Effect of initial pH with aluminum anode on turbidity removal by electrocoagulation, for a kaolin suspension. Solution volume 400 mL, electrolysis duration 2.75 minutes, average initial turbidity 290 NTU, current density 2.0 mA cm-2. Turbidity removal was measured after treated sample was allowed to settle for 20 minutes.

From FIG. 20, it is clear that the aluminum based EC is effective at only a narrow range of pH. In fact only two points, initial pH of 4.5 and 6 achieved a turbidity removal of >90%. Even the case with the initial pH of 3 did not provide the highest possible removal. For pH greater than 6, the turbidity removal performance decreased dramatically. At an initial pH of 9.0, very low turbidity removal was obtained, similar to the removal achieved in the control experiment with no EC (FIG. 10).

From the plot of pH after electrolysis, it is clear that the two points with the maximum removals are within the pH range for sweep flocculation range of 6 to 8, and this may be taken as an indication of the maximum removal rates. All the other points are outside this pH range. For an initial pH of 3.0, the final pH was only 4.5, suggesting that the removal mechanism in this case was predominantly charge neutralization. The last two points which are well above pH 8, indicating that the aluminum hydroxide precipitates have further hydrolyzed to form aluminum hydroxyl anions which re-stabilize the colloidal suspension and thus hinders flocculation.

Iron on the other hand demonstrated to be very effective at a wider range of pH. All five cases had very high removals, with the middle points 4.5, 6.0, and 7.5 all demonstrating maximum removals. The first point had only slightly lower removals. All these points are within the sweep flocculation range pH of between 6 and 8, based on the plot in FIG. 23. Moreover, even the last point which had a final pH of over 9 had very high removals. This indicates that with iron, even at higher, more basic pH, it is possible to have high concentrations of precipitates that allow more sweep flocculation. Aluminum at the same pH of 9 would have had significantly lower concentrations of precipitates, thus explaining the very low turbidity removals. This is consistent with literature reports of iron being more effective at coagulation over a wider range of pH (Reynolds & Richards, 1996).

FIG. 20 is a graph illustrating the effect of initial pH with aluminum anode on turbidity removal by electrocoagulation, for a kaolin suspension. Solution volume 400 mL, electrolysis duration 2.75 minutes, average initial turbidity 290 NTU, current density 2.0 mA $cm^{-2}$. Turbidity removal was measured after treated sample was allowed to settle for 20 minutes. FIG. 21 is a graph illustrating pH after electrolysis aluminum anode based on FIG. 20.

Figure 23:
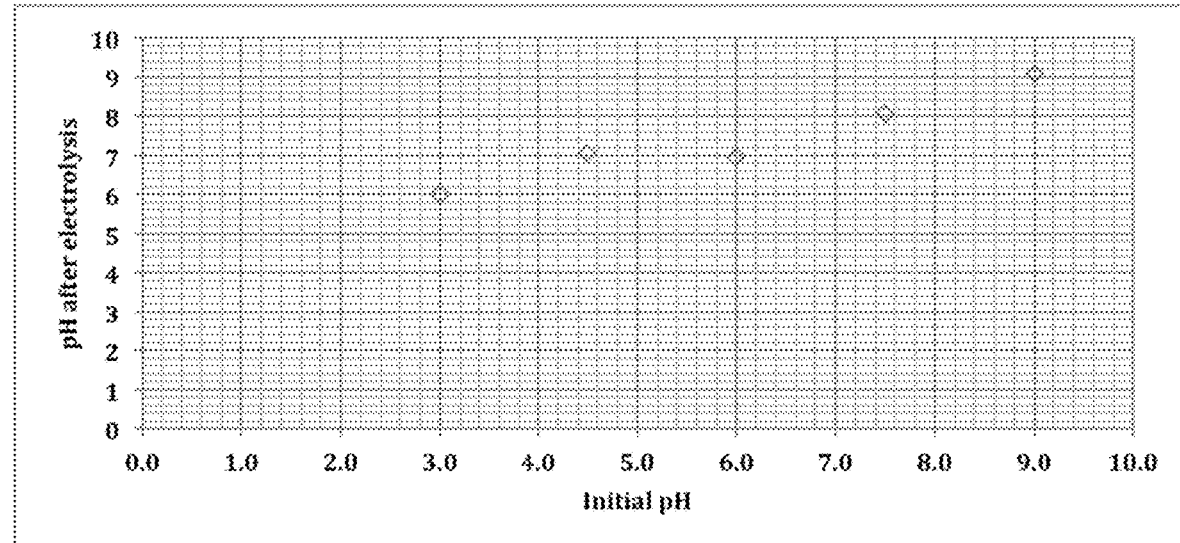
FIG. 23: pH after electrolysis steel aluminum based on FIG. 21.

FIG. 22 is a graph illustrating the effect of initial pH with steel anode on turbidity removal by electrocoagulation, for a kaolin suspension. Solution volume 400 mL, electrolysis duration 4.38 minutes, average initial turbidity 290 NTU, current density 2.0 mA $cm^{-2}$. Turbidity removal was measured after treated sample was allowed to settle for 20 minutes. FIG. 23 is a graph illustrating pH after electrolysis steel aluminum based on FIG. 22.

Corrugated Plates Cell Results; Turbidity Removal Performance

With corrugated plates, the oscillating anode may be adapted to improve turbidity removals, as with the flat plate cell. Moreover, by the use of multiple number of these plates, bipolar mode of contaminant removals can be tested, and compared against the monopolar case. By the use of multiple electrodes, in select embodiments, for a given current density, the electrolysis duration for maximum turbidity removal can be further decreased.

For the Examples illustrating the corrugated plates, the cell had 13 plates. All the plates in this case were made of mild carbon steel. Due to time constraint, only carbon steel material/iron was tested for this cell design and not aluminum. The first set of Examples were conducted with bipolar mode with both oscillating and stationary configurations tested.

For the previous case with the flat plates cell, two different current densities were tested, 0.5 mA/cm$^2$ and 2.0 mA/cm$^2$. For the case with the corrugated plates, due to the bipolar mode of operation and the small area of the end plates, only 2.0 mA/cm$^2$ was tested as with 0.5 mA/cm$^2$, the current to be generated is so small that it could not be set by the power supply in use.

Apart from the very different electrochemical reactor design, the sample preparation and the treatment procedure was the same. The sample prepared had the same composition as the prior cases, i.e. 1 g/L of kaolin dispersed in water, with 60 mg/L of poly acrylic acid sodium salt. As before, 3 g/L sodium chloride was added to increase the conductivity of the water and to simulate the saline tailings water. The initial pH of the sample was 4.5. Following electrolysis in the corrugated plates cell, the sample was allowed to settle for 20 minutes before determining the turbidity removals. The results of the turbidity removal performance of the corrugated plate cell in bipolar and monopolar modes are discussed below.

Bipolar Cell Test Results; Oscillating and Stationary

Examples were conducted to compare whether for the case with a cell of multiple electrodes in bipolar configuration, oscillations would improve turbidity removals. The first set of Examples were conducted with oscillating anodes at current density of 2 mA/cm$^2$. From FIG. 17, the concentrations of 1.00 mmol/L and 1.16 mmol/L were selected and the corresponding electrolysis durations for the case of bipolar corrugated plates were determined based on Faraday's Law assuming 100% current efficiency and the absence of bypass currents. At concentrations under 1.00 mmol/L from FIG. 17, the electrolysis durations were determined to be very low for the bipolar cell and hence were not selected to perform Examples. The electrolysis durations at 1.00 mmol/L and 1.16 mmol/L for the corrugated plates cell in bipolar configuration were 75 and 84 seconds respectively assuming 100% current efficiency and no bypass currents.

Figure 24:
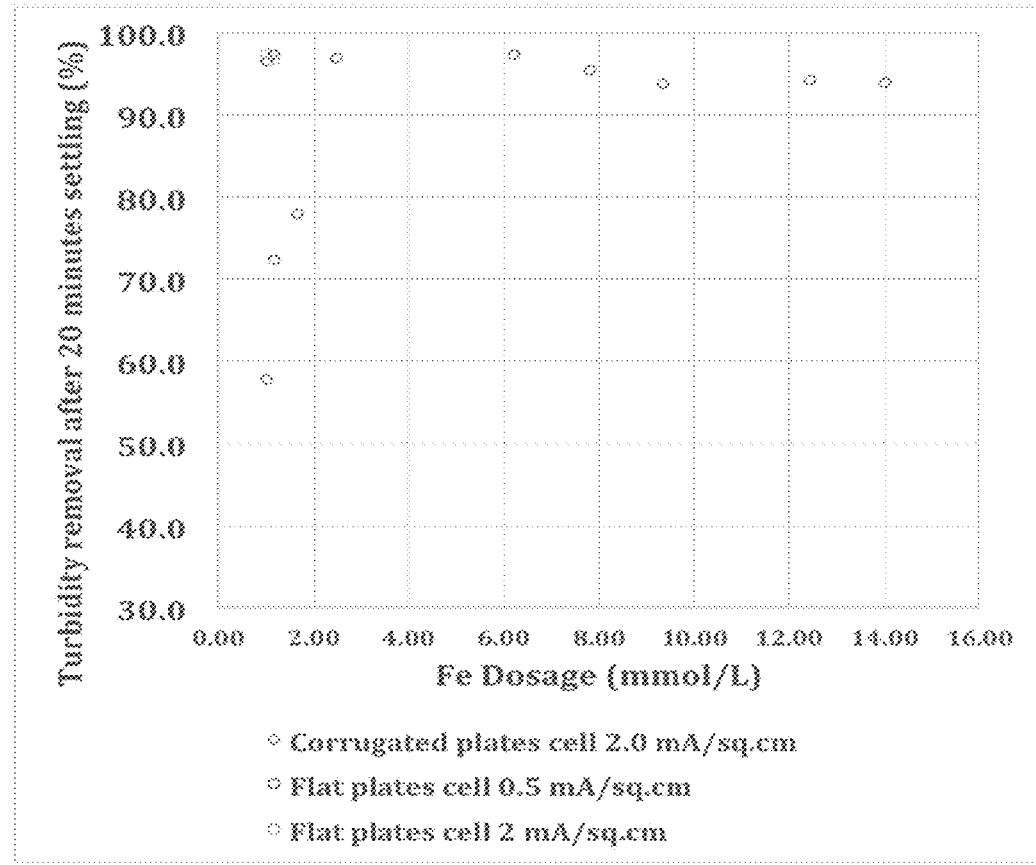
FIG. 24: Turbidity removals for oscillating electrodes: Comparing bipolar case of corrugated cell with the flat plates cell at the two different current densities, but equal dosage based on Equation 1. Initial pH 4.5. Volume of water treated 400 mL.
Figure 25:
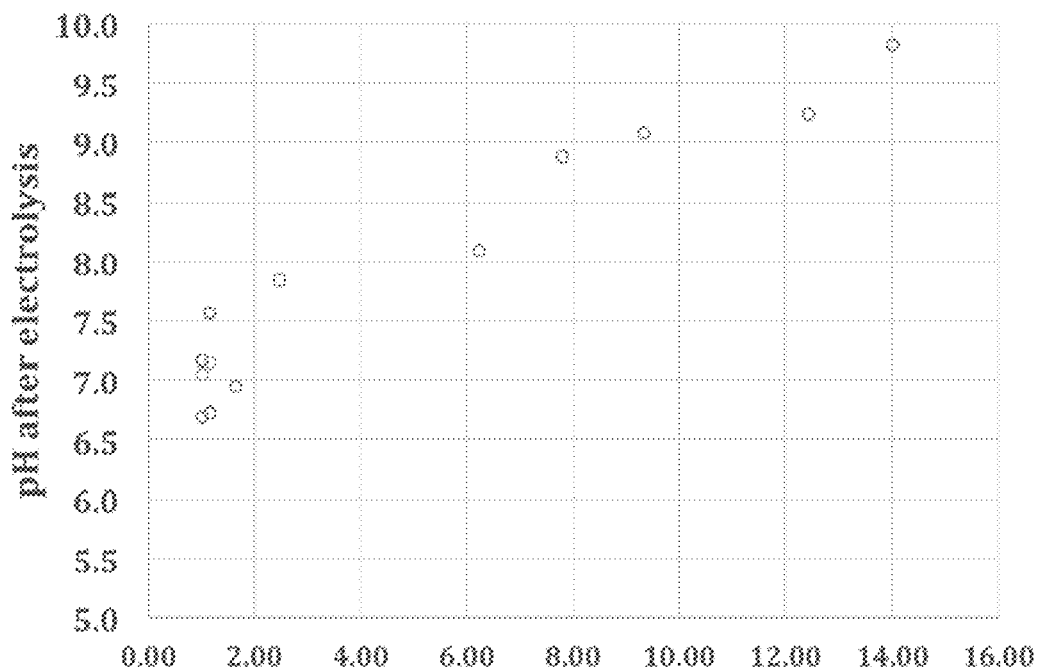
FIG. 25: pH after electrolysis plot for oscillating electrodes for data in FIG. 23: Comparing bipolar case of corrugated cell with the flat plates cell at the two different current densities.

At these two theoretical coagulant doses, the turbidity removals obtained at 2.0 mA/cm$^2$ for the case of bipolar corrugated configuration, the turbidity removals were significantly lower than that of the flat plate cell. The comparison between these two theoretical points is shown in FIG. 24. As seen in FIG. 24, for the case of the bipolar corrugated plate cell, a significantly higher metal concentration was required to achieve high turbidity removal. At coagulant doses of greater than 6.22 mmol/L, the turbidity removals decreased. This can be explained based on the pH after electrolysis plot as seen in FIG. 25. For iron doses of greater than 6.22 mmol/L, the pH was well above the range of 6 to 8, which is the sweep flocculation range. Therefore, due to the dissolution of some of the precipitates and slight increase in stability of the colloidal suspension, turbidity removals decrease. This is similar to the case in FIG. 22, where for the flat plates steel cell, at higher pH, turbidity removals decreased.

FIG. 24 is graph showing turbidity removals for oscillating electrodes: Comparing bipolar case of corrugated cell with the flat plates cell at the two different current densities, but equal dosage based on Equation 1. Initial pH 4.5. Volume of water treated 400 mL.

FIG. 25 is a graph illustrating pH after electrolysis plot for oscillating electrodes for data in FIG. 24: Comparing bipolar case of corrugated cell with the flat plates cell at the two different current densities.

Figure 26:
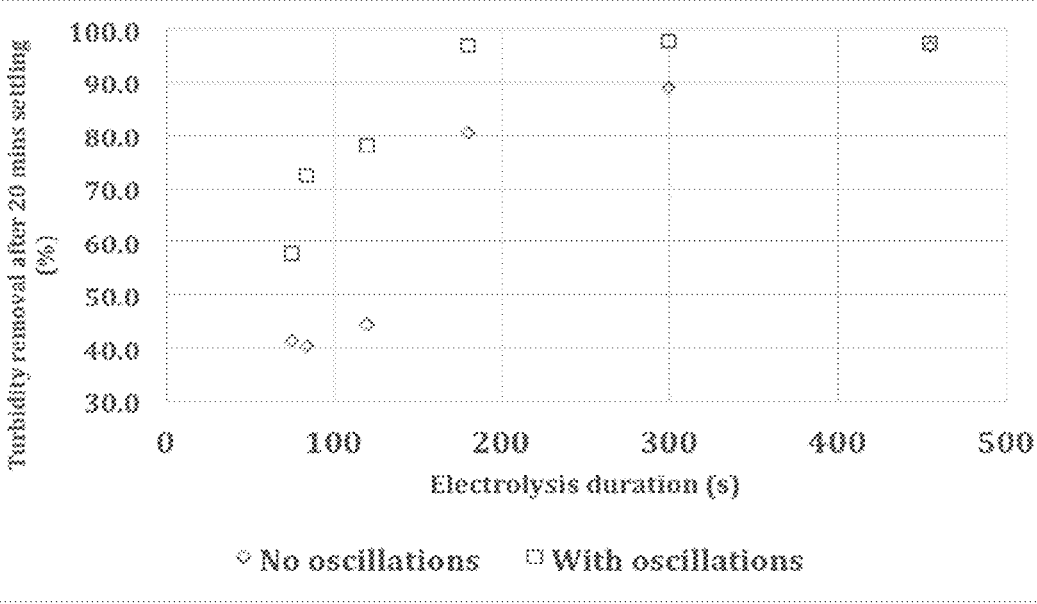
FIG. 26: Effect of electrolysis duration and stationary vs oscillations on turbidity removal by electrocoagulation, for a kaolin suspension. Bipolar corrugated cell, solution volume 400 mL, initial pH 4.5, average initial turbidity range 290 NTU, current density 2 mA cm-2. Turbidity removal was determined by measuring the turbidity of the treated after allowing 20 minutes settling.
Figure 27:
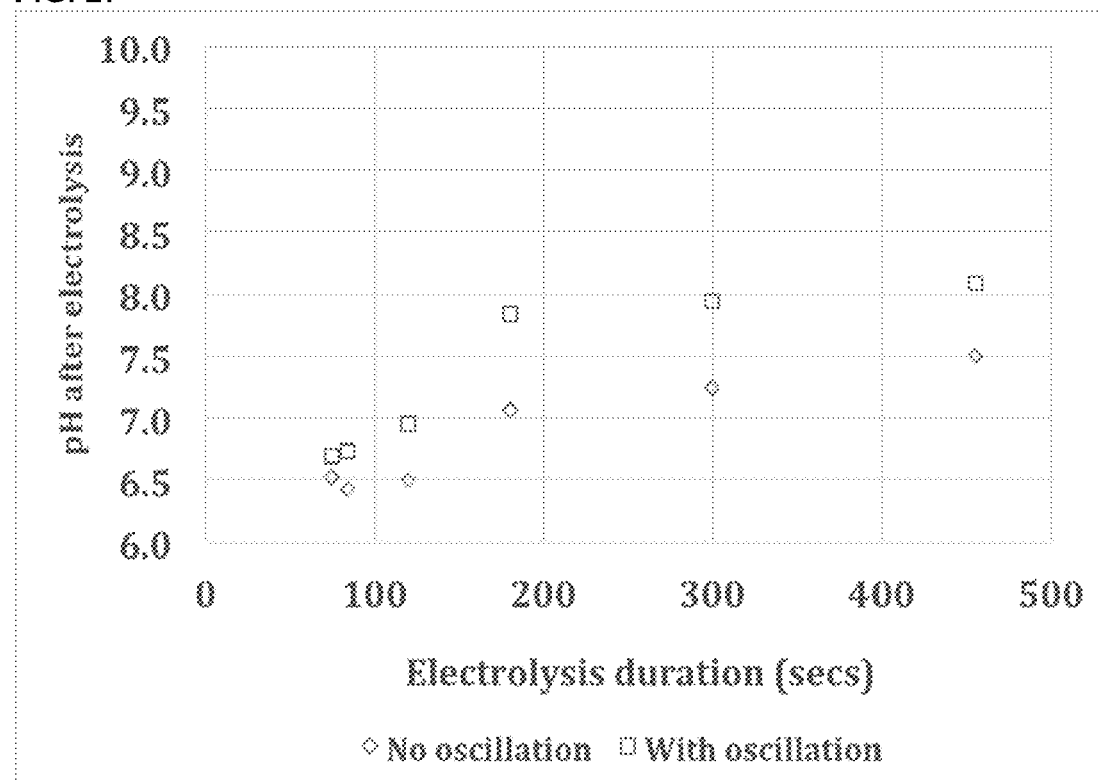
FIG. 27: pH after electrolysis for the set of data in FIG. 25.

For Fe doses less than 6.22 mmol/L, a gradual increase in turbidity removal with Fe dose was observed up to the maximum turbidity removal of around 95%. For these sets of electrolysis durations, the performance of both oscillating and stationary electrodes with bipolar configuration was compared and is illustrated by FIG. 26. The difference in turbidity removal performance was more significant for this case than all the previous cases that compared stationary and oscillating electrodes. Oscillations for this cell design and mode of operation decreased the electrolysis duration required for maximum (>90%) turbidity removal by approximately 67%. FIG. 27 compares the pH after electrolysis.

FIG. 26 is a graph showing the effect of electrolysis duration and stationary vs oscillations on turbidity removal by electrocoagulation, for a kaolin suspension. Bipolar corrugated cell, solution volume 400 mL, initial pH 4.5, average initial turbidity range 290 NTU, current density 2 mA cm$^{-2}$. Turbidity removal was determined by measuring the turbidity of the treated after allowing 20 minutes settling.

FIG. 27 is a graph showing pH after electrolysis for the set of data in FIG. 26. From the pH after electrolysis plot, it is clear that the removals are within the sweep flocculation range. The pH values between the oscillating and stationary case are close.

Monopolar Cell Test Results

For the monopolar case, Examples were carried out an electrolysis durations corresponding to the same theoretical iron dosage as for the bipolar Examples, at a monopolar current density of 2 mA/cm$^2$. The turbidity removals of monopolar oscillating corrugated plates is compared to bipolar oscillating corrugated plates in FIG. 28. An issue with the bipolar configuration when compared to monopolar is the presence of bypass current. Bypass current is a phenomenon whereby there is current leakage from the series of redox pairs and therefore, the net electrode reaction produced is lower than what is expected theoretically. Hence, due to bypass current, the amount of metal electrodissolved could be lower in the case of bipolar than the monopolar case, for which there is a parallel connection, and so bypass currents are avoided. However, based on the turbidity removals plot in FIG. 28, the turbidity removal performance is very similar. If bypass currents were significant, the monopolar would be expected to have significantly outperformed the bipolar case in turbidity removals. Since this is not the case, it can be concluded that for this case, bypass current is very low.

Figure 28:
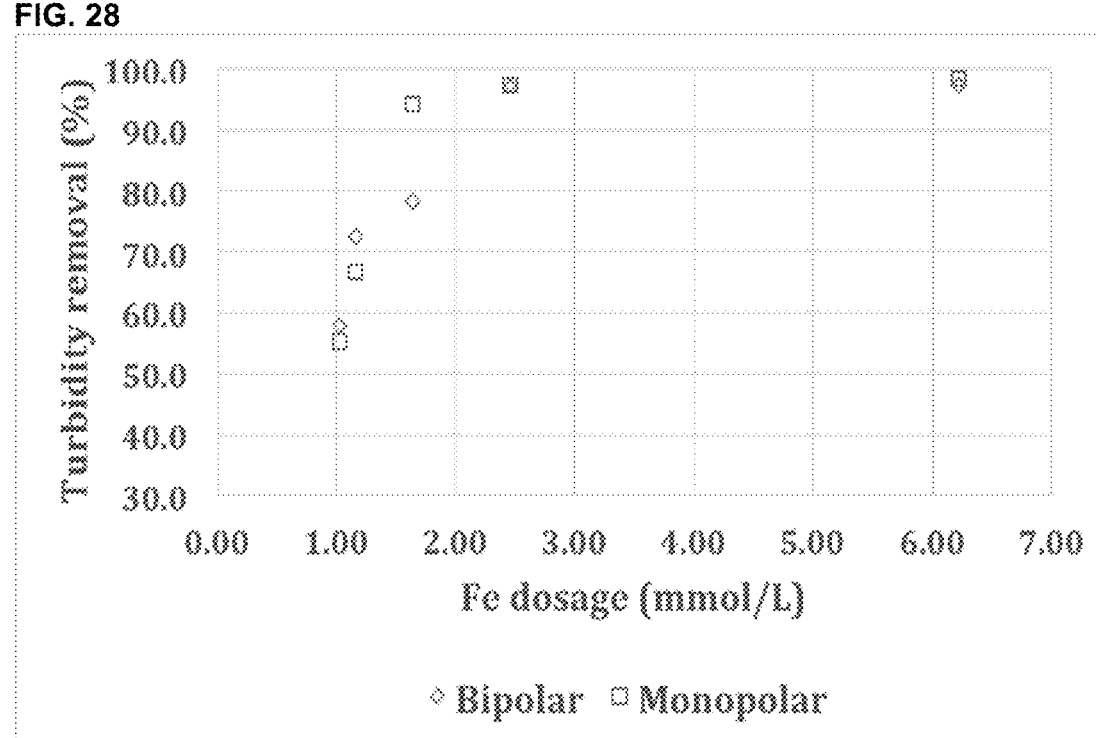
FIG. 28: Effect of iron dosage determined based on Equation 1 and bipolar vs monopolar case with oscillations on turbidity removal by electrocoagulation, for a kaolin suspension. Solution volume 400 mL, initial pH 4.5, average initial turbidity range 290 NTU, current density 2 mA cm-2. Turbidity removal was determined by measuring the turbidity of the treated after allowing 20 minutes settling.

FIG. 28 is a graph showing the effect of iron dosage determined based on Equation 1 and bipolar vs monopolar case with oscillations on turbidity removal by electrocoagulation, for a kaolin suspension. Solution volume 400 mL, initial pH 4.5, average initial turbidity range 290 NTU, current density 2 mA cm$^{-2}$. Turbidity removal was determined by measuring the turbidity of the treated after allowing 20 minutes settling.

Figure 29:
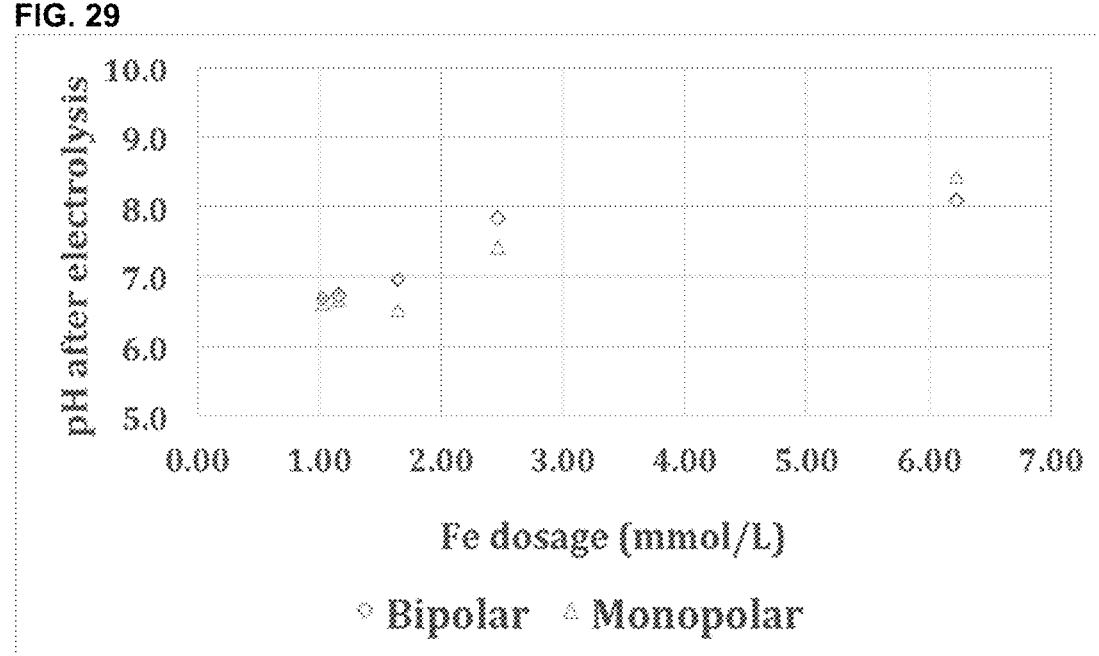
FIG. 29: Comparing bipolar and monopolar pH after electrolysis based on data in FIG. 27.

FIG. 29 is a graph comparing bipolar and monopolar pH after electrolysis based on data in FIG. 28. The pH obtained after electrolysis (FIG. 29), for the monopolar case was found to be similar to that of the bipolar case. This could also suggest that bypass current in the bipolar oscillating case is insignificant. From the pH range, most of the contaminant removals are in the sweep flocculation stage.

Figure 30:
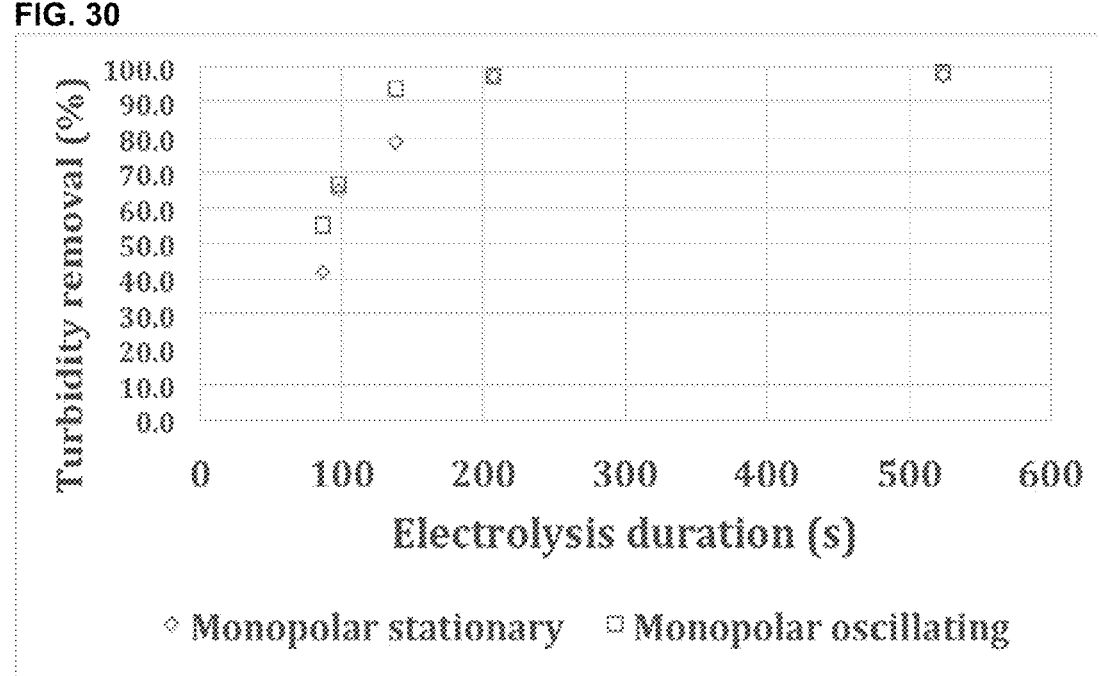
FIG. 30: Effect of electrolysis duration and stationary vs oscillations on turbidity removal by electrocoagulation, for a kaolin suspension. Monopolar corrugated cell, solution volume 400 mL, initial pH 4.5, average initial turbidity range 290 NTU, current density 2 mA cm-2. Turbidity removal was determined by measuring the turbidity of the treated after allowing 20 minutes settling.
Figure 31:
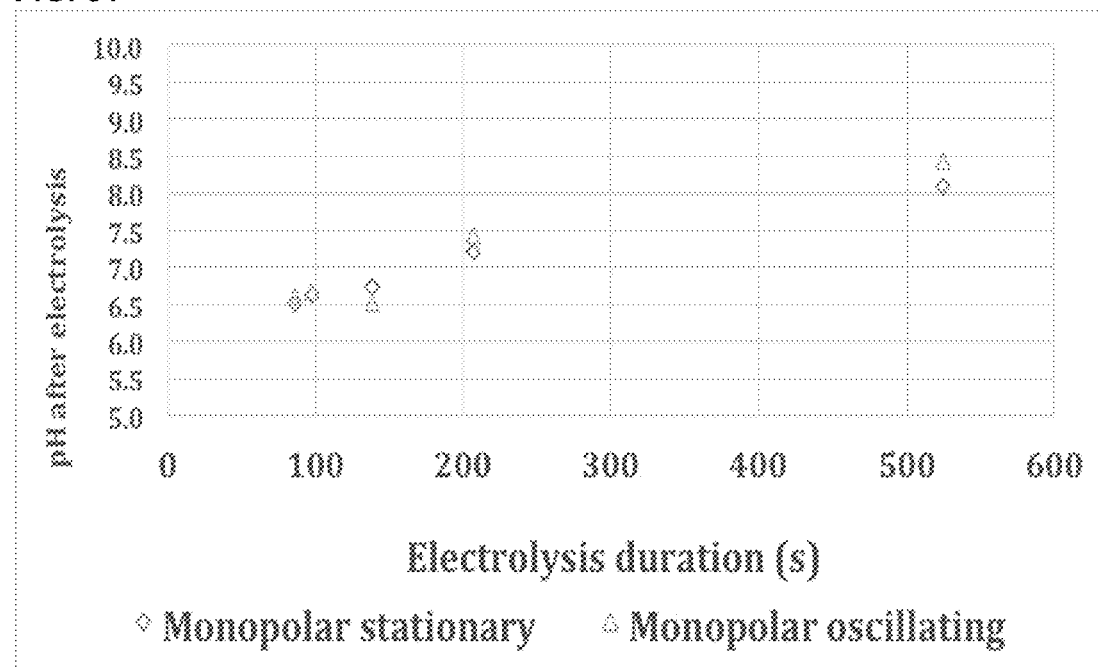
FIG. 31: pH after electrolysis for the set of data in FIG. 29.

The comparison between the turbidity removal as a function of electrolysis duration for oscillating and stationary cases for monopolar configuration is shown in FIG. 30, which is a graph illustrating the effect of electrolysis duration and stationary vs oscillations on turbidity removal by electrocoagulation, for a kaolin suspension. Monopolar corrugated cell, solution volume 400 mL, initial pH 4.5, average initial turbidity range 290 NTU, current density 2 mA cm$^{-2}$. Turbidity removal was determined by measuring the turbidity of the treated after allowing 20 minutes settling. The turbidity removal profile is quite similar for both the cases. FIG. 31 is a graph illustrating pH after electrolysis for the set of data in FIG. 30.

Figure 32:
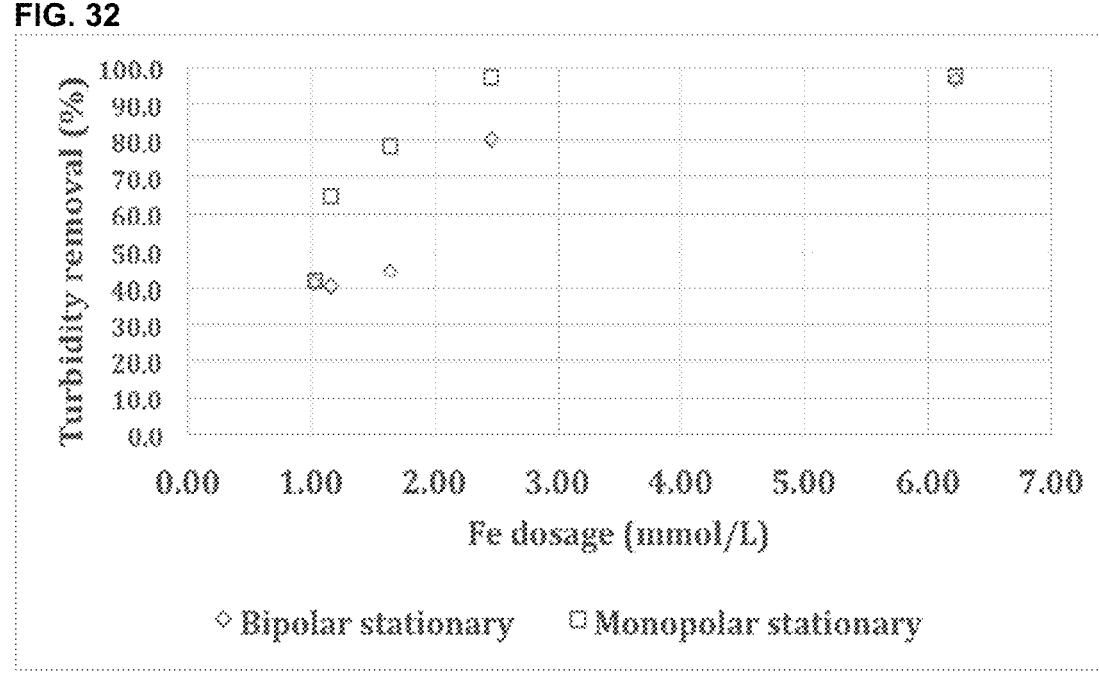
FIG. 32: Effect of iron dosage determined based on Equation 1 and bipolar vs monopolar case with stationary electrodes on turbidity removal by electrocoagulation, for a kaolin suspension. Corrugated cell, solution volume 400 mL, initial pH 4.5, average initial turbidity range 290 NTU, current density 2 mA cm-2. Turbidity removal was determined by measuring the turbidity of the treated after allowing 20 minutes settling.
Figure 33:
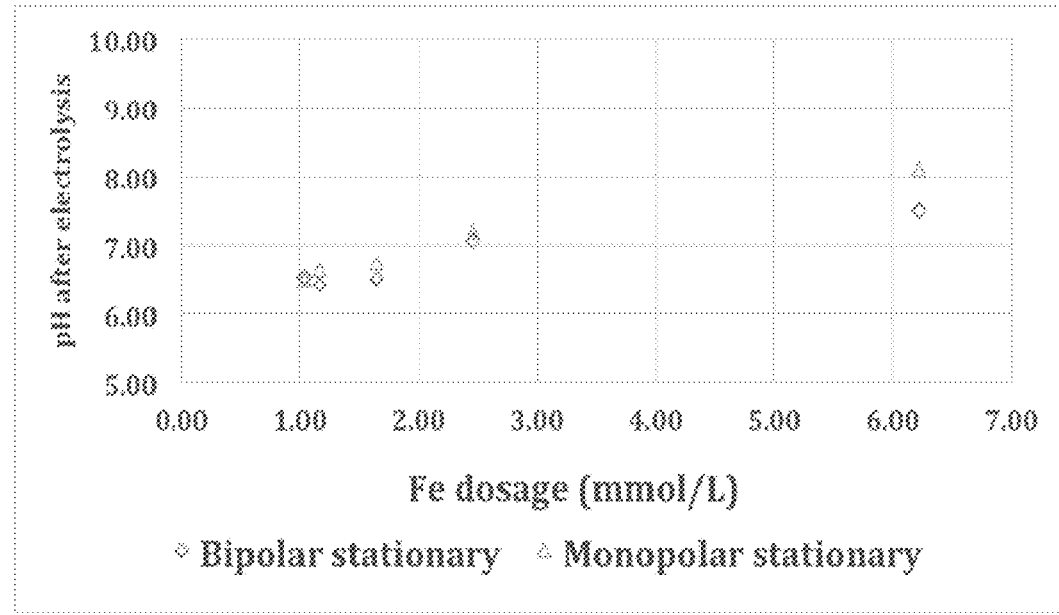
FIG. 33: Comparing bipolar and monopolar pH after electrolysis based on data in FIG. 31.

Another set of comparison was made between bipolar stationary and monopolar stationary for the same set of dosage in the previous figures with monopolar configuration. It is as shown in FIG. 32. Comparing the turbidity removals for the two configurations with stationary anodes, it is clear that the monopolar significantly outperforms the bipolar configuration. Hence, one can conclude that bypass currents are significant in the stationary case. This is very different from the oscillating case, where there was no significant difference between the monopolar and bipolar configuration with regards to turbidity removals and thus had no significant bypass currents. As the electrodes move closer together, the bypass current will be significantly lower. The pH after electrolysis plot in FIG. 33 comparing bipolar vs monopolar for the stationary case shows the two pH profiles to be quite similar. The pH range shows that most of the turbidity removals are in the sweep flocculation stage.

FIG. 32 is a graph showing the effect of iron dosage determined based on Equation 1 and bipolar vs monopolar case with stationary electrodes on turbidity removal by electrocoagulation, for a kaolin suspension. Corrugated cell, solution volume 400 mL, initial pH 4.5, average initial turbidity range 290 NTU, current density 2 mA cm$^{-2}$. Turbidity removal was determined by measuring the turbidity of the treated after allowing 20 minutes settling. FIG. 33 is a graph comparing bipolar and monopolar pH after electrolysis based on data in FIG. 32.

Voltage Measurements and Energy Requirement

For the earlier cases of turbidity removal performance, the voltage could not be clearly measured with the power supply. Therefore, a Metrohm potentiostat (Voltalab PGstat) was utilized to accurately monitor the cell voltage, from which the energy requirement can be subsequently determined. Focus was given to the impact of oscillations on voltage and electrochemical energy requirements.

Samples prepared were identical to the samples used for the turbidity removal tests. Kaolin of 1 g/L was dispersed in tap water in the presence of the dispersant poly-acrylic acid sodium salt of 60 mg/L. Sodium chloride was added at a concentration of 3 g/L. The pH of the sample was set at 4.5. All the Examples were carried out at 2 mA/cm$^2$ current density.

Figure 34:
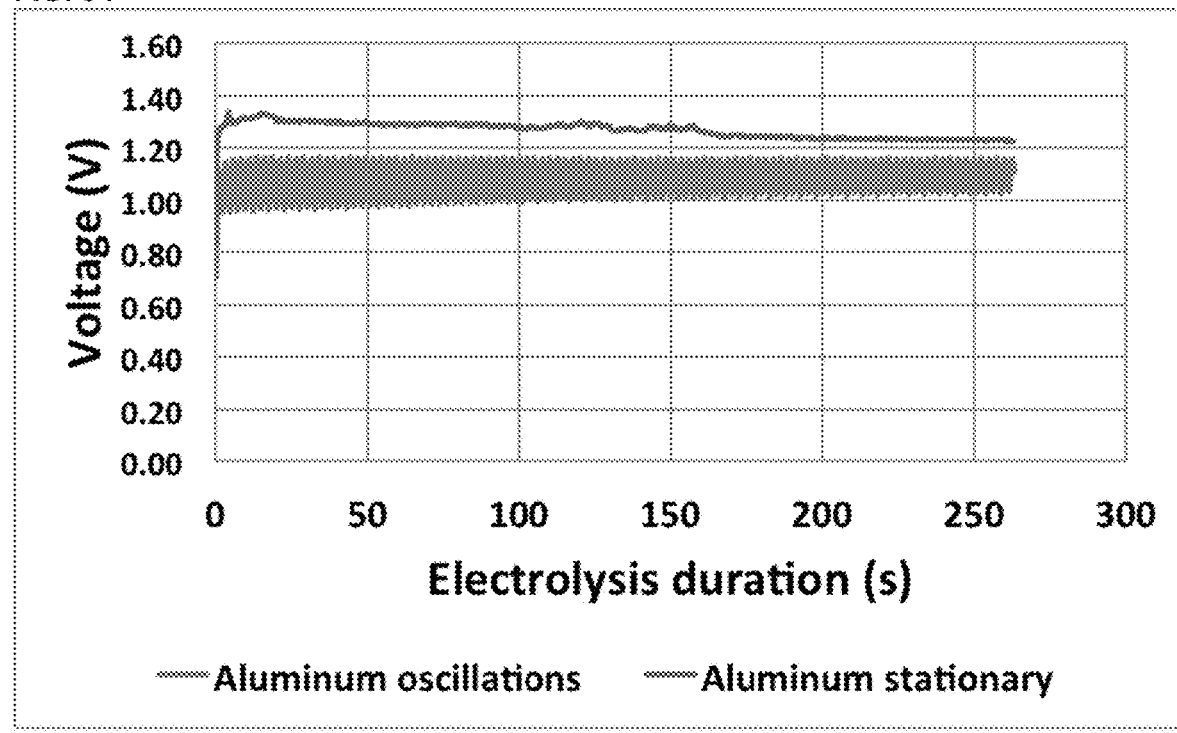
FIG. 34: Comparing the cell potentials between stationary and oscillating anode anode at 2 mA/cm2 current density for kaolin suspensions, initial pH 4.5, and electrolysis duration 263 s.

The first set of Examples were conducted using the flat plates cell with the aluminum anode. Both oscillation and stationary cases were tested. For the case of the aluminum, duration of 263 seconds or 4.38 minutes, the maximum duration from FIG. 16 show the highest current density with the highest dosage. For these conditions, the turbidity removals were ca, 95%, chosen to compare the electrochemical energy required for effective treatment for the stationary and oscillating cases. FIG. 34 is a graph comparing the cell potentials between stationary and oscillating anode anode at 2 mA/cm$^2$ current density for kaolin suspensions, initial pH 4.5, and electrolysis duration 263 s. FIG. 34 accordingly compares the cell potentials of aluminum oscillating and stationary electrodes for the flat plate cell. From this plot, oscillations significantly lowered the cell potential when compared to stationary. There was a reduction in cell potential from not just mass transport effects in the presence of oscillations, but also by bringing the anode closer to one of the cathodes, the cell potential gets lowered even further. Thus electrochemical energy savings can be achieved from both reduced treatment duration for maximum removal and from lowered cell potential. The data shown in FIG. 34 was integrated numerically (using the Trapezoidal Rule) to determine the electrical energy consumption, for a duration of 263 seconds, the cell energy was 320 J/L for the oscillating case and 375 J/L for the stationary case.

Figure 35:
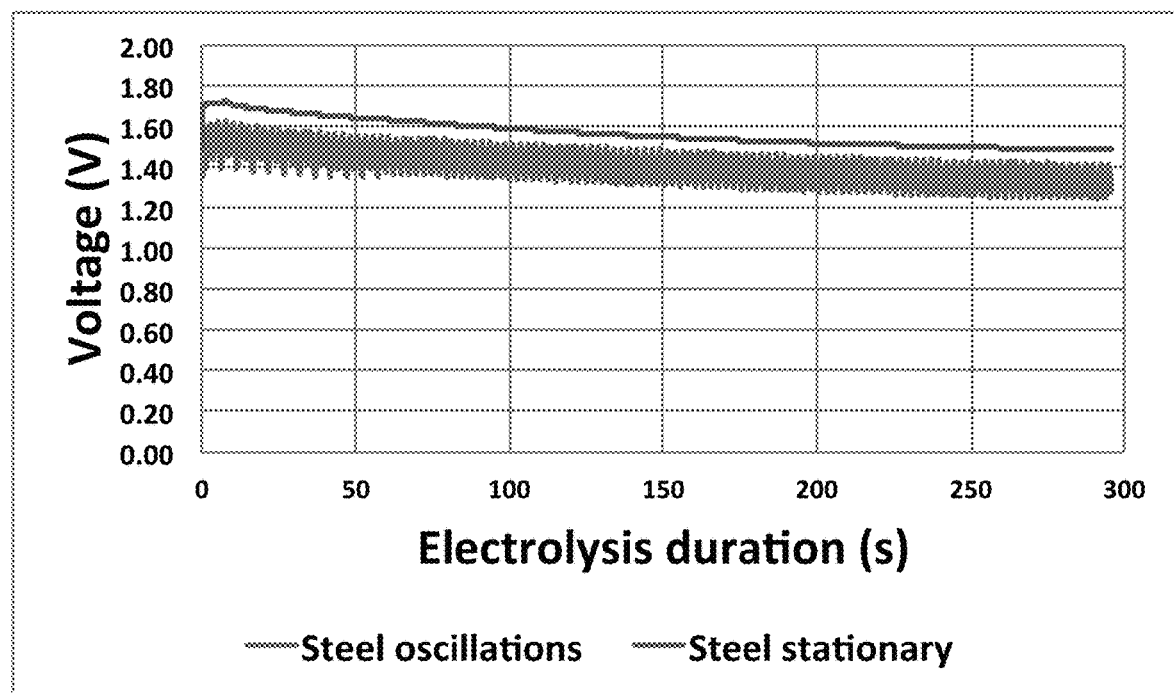
FIG. 35: Comparing the cell potentials between stationary and oscillating steel anode at 2 mA/cm2 current density for kaolin suspensions, initial pH 4.5, and electrolysis duration 296 s.

A similar procedure was performed for the steel anode to compare the cell potentials between stationary and oscillating cases. The comparison is illustrated by FIG. 35, which is is a graph comparing the cell potentials between stationary and oscillating steel anode at 2 mA/cm$^2$ current density for kaolin suspensions, initial pH 4.5, and electrolysis duration 296 s. From this plot, it is clear that for steel as well, oscillations had an impact by significantly lowering the cell potentials. For steel, the duration of 296 seconds was selected. The electrochemical energy required for this case is 468 J/L for the oscillations case and 522 J/L for the stationary case.

Figure 36:
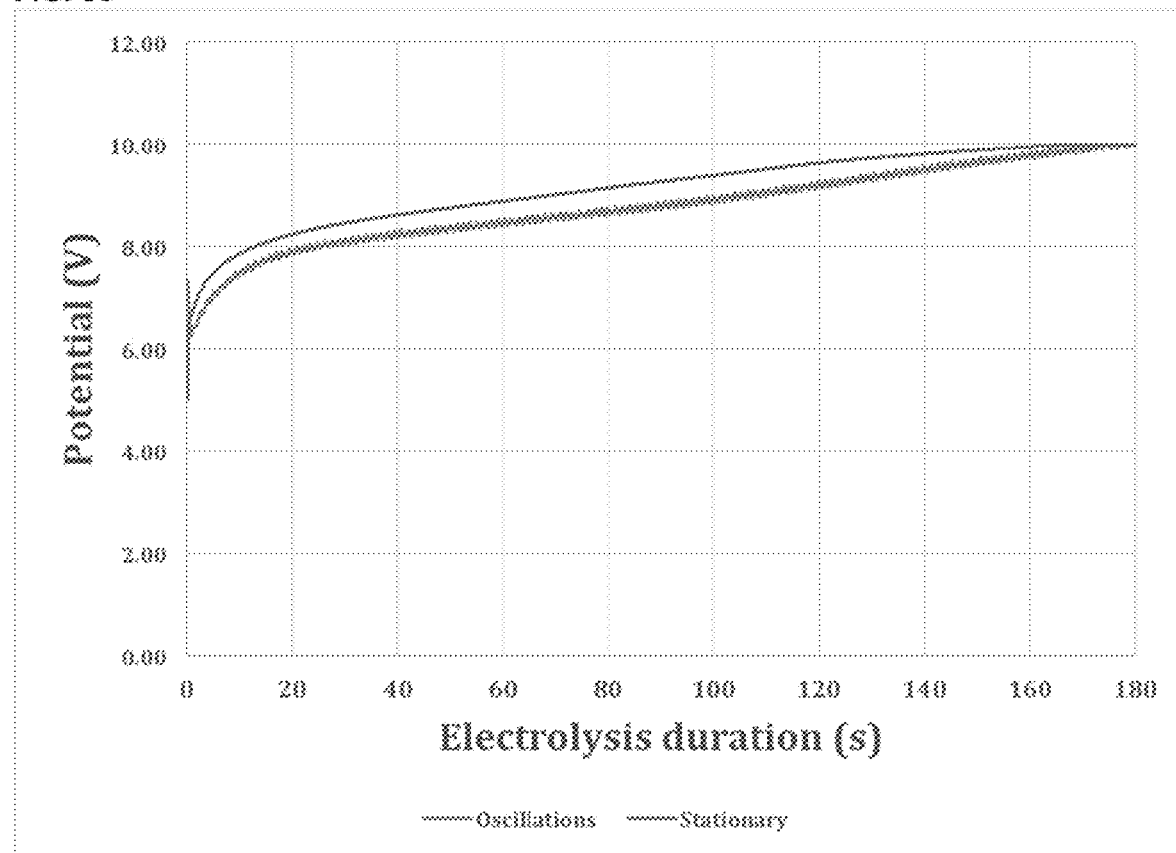
FIG. 36: Comparing the cell potentials between stationary and oscillations steel bipolar corrugated electrodes at 2 mA/cm2 current density for kaolin suspensions, initial pH 4.5, and electrolysis duration of 180 s.

Using similar procedure, the potentials of oscillating versus stationary electrodes for the bipolar corrugated case was tested. The current was set at 2 mA/cm$^2$ and the electrolysis duration selected was 180 seconds as it is at this duration based on FIG. 26, that the maximum removal is first observed for the case of oscillating anode. FIG. 36 compares the cell voltages obtained from the stationary and oscillating electrodes, in a graph comparing the cell potentials between stationary and oscillations steel bipolar corrugated electrodes at 2 mA/cm$^2$ current density for kaolin suspensions, initial pH 4.5, and electrolysis duration of 180 s. Again, the potential for the oscillating case is lower than the potential for the stationary plates. The amplitude of the oscillations in the oscillating case is smaller due to the fact that the amplitude of the oscillations of the plates is lower. For the bipolar case as well, based on FIG. 26, there was electrochemical energy savings from reduced treatment time. However from FIG. 36, there is also electrical energy saved from reduced cell potential.

Based on FIG. 36, at a total duration of 180 seconds, the energy calculated from the integral for the oscillation case is 515 J/L and for the stationary case is 535 J/L. Similarly for the monopolar case, from a duration of 207 seconds selected based on FIG. 29 at which point, the turbidity removals just hit maximum.

Figure 37:
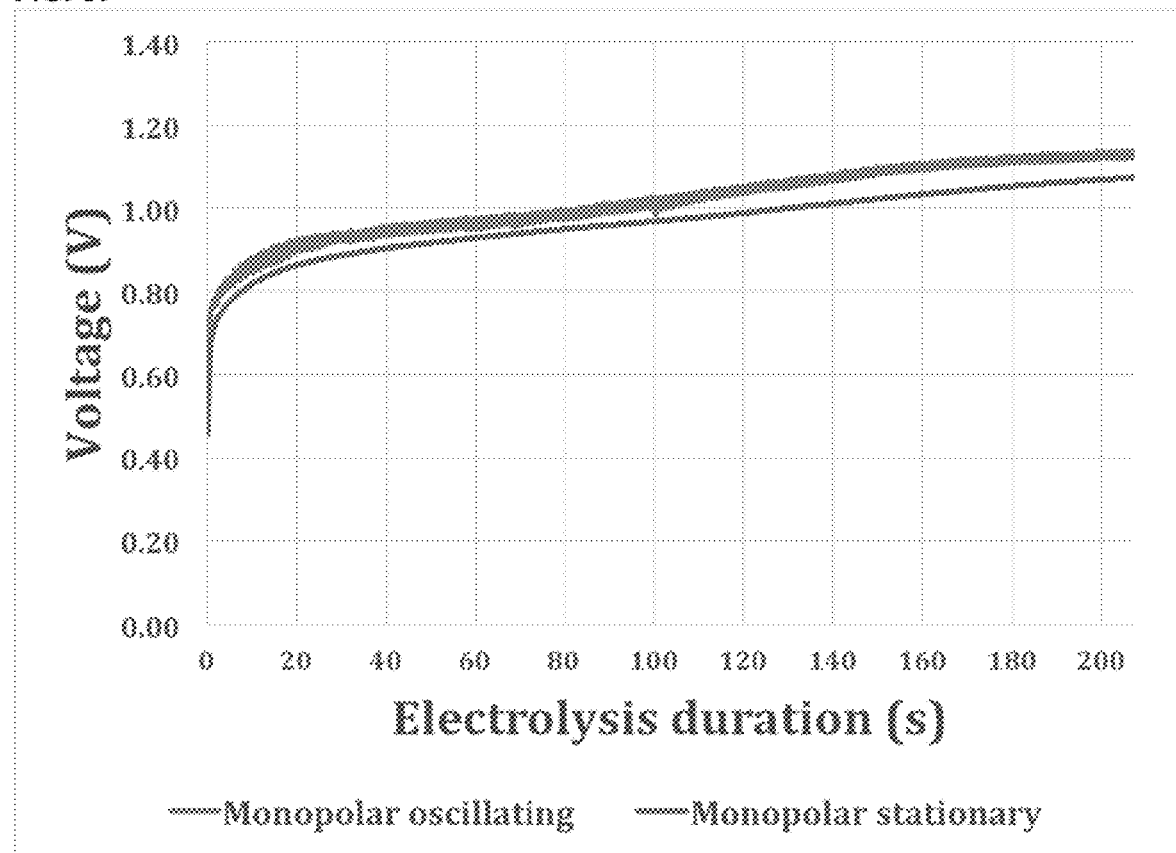
FIG. 37: Comparing the cell potentials between stationary and oscillations steel monopolar corrugated electrodes at 2 mA/cm2 current density for kaolin suspensions, initial pH 4.5, and electrolysis duration of 207 s.

The plot comparing the potentials is as shown by FIG. 37. For the oscillating case with monopolar cell, the oscillating case yielded greater potentials than the stationary case. Tests were conducted to illustrate the effect of passivation in causing this to occur. Hence, a case of lowered current density was tested. For this case, the oscillating case yielded lower potentials than the stationary case.

FIG. 37 is a graph comparing the cell potentials between stationary and oscillations steel monopolar corrugated electrodes at 2 mA/cm$^2$ current density for kaolin suspensions, initial pH 4.5, and electrolysis duration of 207 s. Based on FIG. 37, for the duration of 207 seconds, the energy requirement for the oscillating case is 731 J/L and for the stationary case is 694 J/L. Thus, more electrochemical energy is required for the oscillating case.

ICP Analysis

Examples with the Flat Plates Cell

In order to determine the metal concentration of the sample to evaluate the current efficiency and confirm the metal coagulant dose, the ICP instrument was utilized. In order to prepare the samples, RO water was used with sodium chloride of 3 g/L concentration and the pH was adjusted to 4.5. Kaolin was not added because the ICP requires all solids in the sample to be digested prior to being fed to chamber. After electrolysis, the metal precipitates formed were digested using concentrated nitric acid. The sample was then injected into the ICP for determination of the metal concentration in solution.

For the case with aluminum three durations at 2 mA/cm$^2$ were selected. These durations are 132 s, 165 s, and 198 s based on the durations represented by the dosage plots in FIG. 16. All these Examples were carried out using stationary electrodes. One experiment with an oscillating anode was carried out at 198 s to compare it to the stationary in order to determine whether oscillations could differ in current efficiency for electrodissolution. As discussed, Faraday's Law was used as the model for the theoretical.

Figure 38:
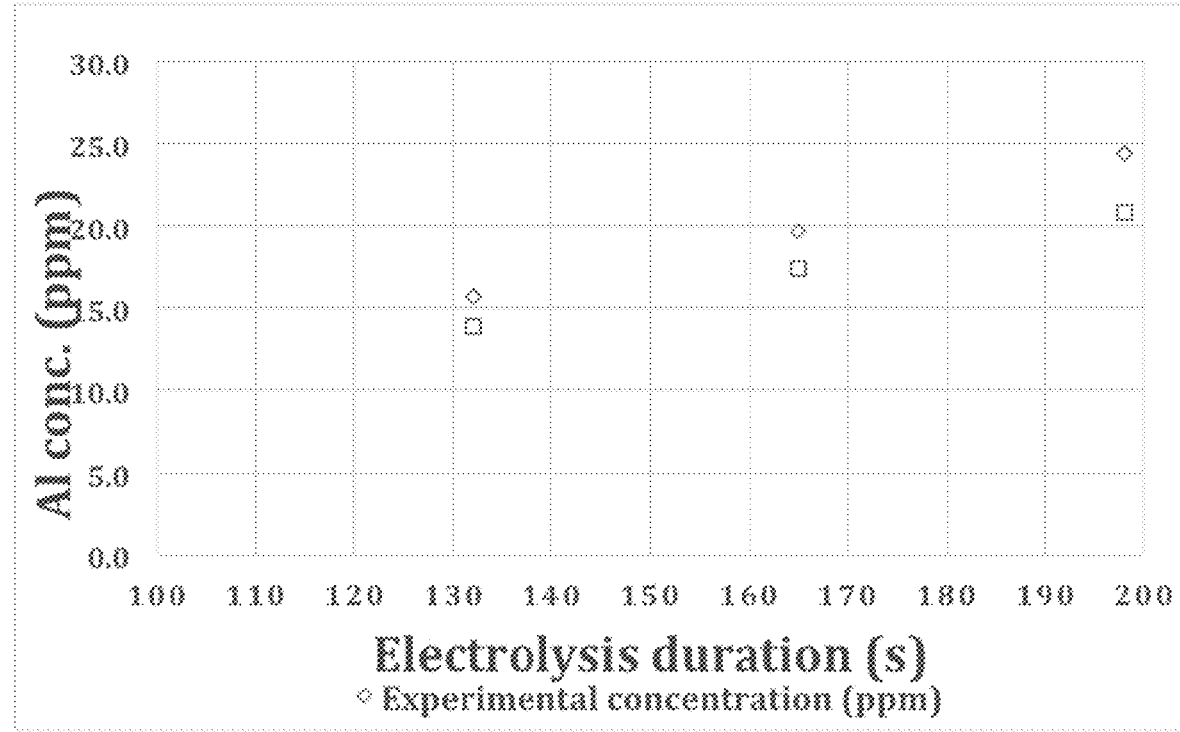
FIG. 38: Comparing experimental concentrations of aluminum with theoretical concentrations for flat plates cell, stationary anode, initial pH 4.5, NaCl (3000 ppm) in RO water solution, 400 mL volume during electrolysis.

FIG. 38 is a graph comparing experimental concentrations of aluminum with theoretical concentrations for flat plates cell, stationary anode, initial pH 4.5, NaCl (3000 ppm) in RO water solution, 400 mL volume during electrolysis. As shown in FIG. 38, the measured aluminum concentrations were found to be close to the theoretical concentrations. In fact, the current efficiency was found to be over 100%. The greater than expected aluminium concentrations could be due to corrosion effects. Some corrosion Examples were conducted by operating the cell at pH 4.5 with no current and the solution aluminium concentrations were determined. Some small concentrations of aluminum were observed without electrolysis. However with electrolysis, the corrosion effects are even more significant because as the anode is oxidized, the ions generated hydrolyze immediately thus lowering the pH at the electrode surface. The pH at the surface of the anode will be the lowest, and this will generate even greater corrosion.

Figure 39:
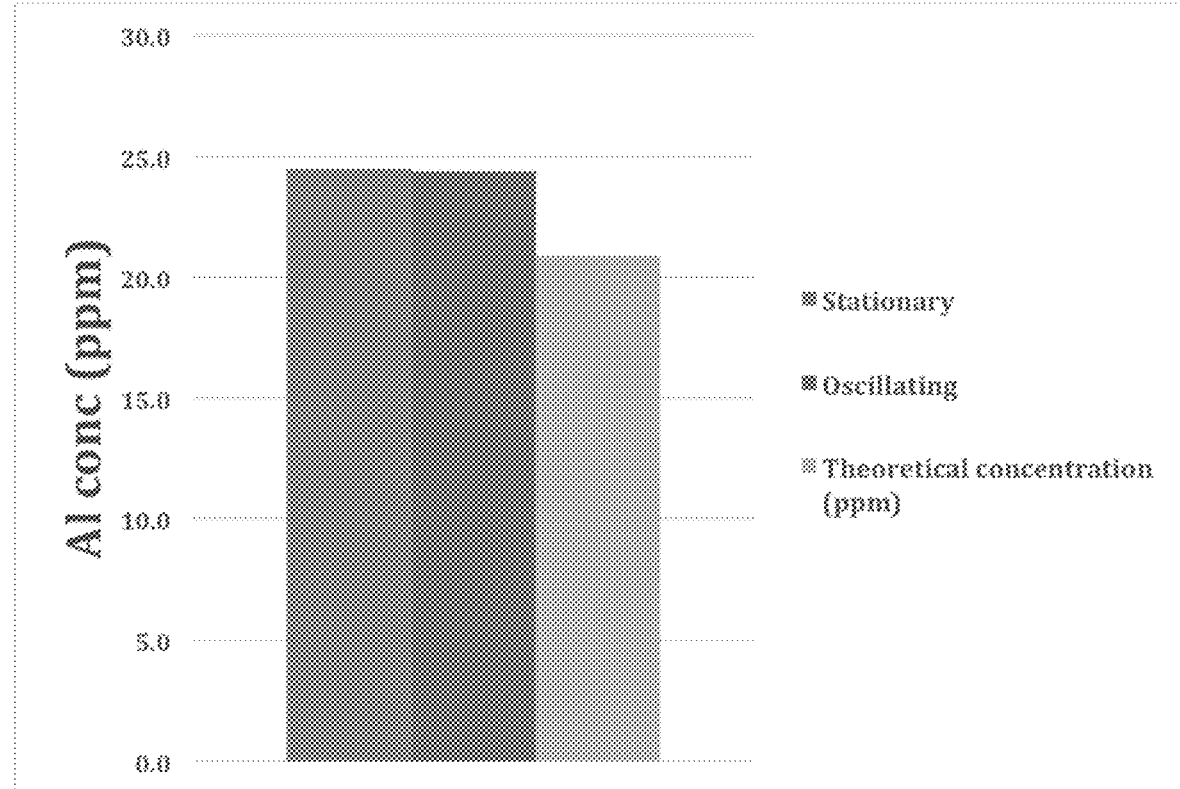
FIG. 39: Comparing stationary vs oscillating anode concentrations of aluminum with theoretical concentrations for flat plates cell, initial pH 4.5, NaCl (3000 ppm) in RO water solution, 400 mL volume during electrolysis.

FIG. 39 is a graph comparing stationary vs oscillating anode concentrations of aluminum with theoretical concentrations for flat plates cell, initial pH 4.5, NaCl (3000 ppm) in RO water solution, 400 mL volume during electrolysis. Based on FIG. 39, comparing the effect of oscillation on electrodissolution, the values of aluminum dissolved with oscillation is nearly identical to that of the case with stationary anode. Thus oscillations appear to have no significant effect on the rate of metal concentration when compared to the stationary case.

Figure 40:
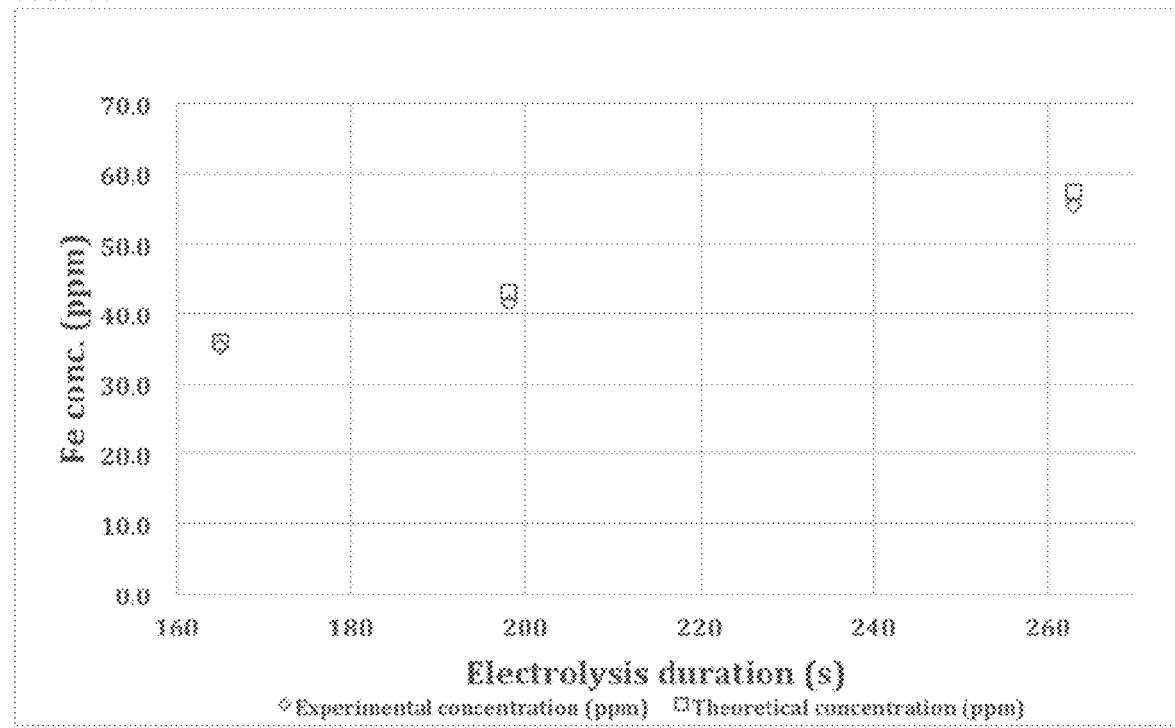
FIG. 40: Comparing experimental concentrations of iron with theoretical concentrations for flat plates cell, stationary steel anode, initial pH 4.5, NaCl (3000 ppm) in RO water solution, 400 mL volume during electrolysis.
Figure 41:
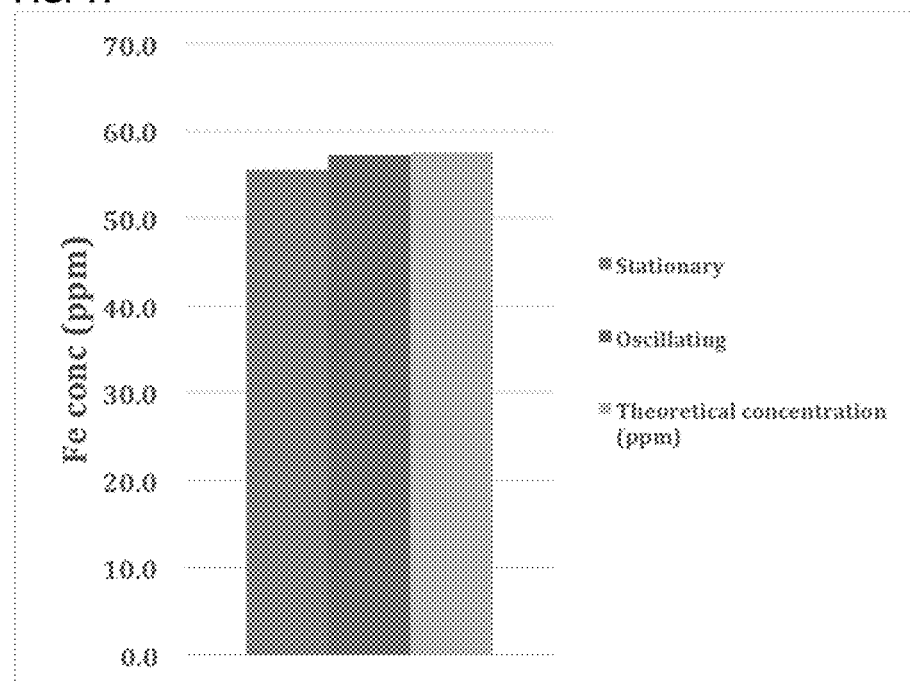
FIG. 41: Comparing stationary vs oscillating anode concentrations of iron with theoretical concentrations for steel flat plates cell, initial pH 4.5, NaCl (3000 ppm) in RO water solution, 400 mL volume during electrolysis.

A similar procedure was conducted for the steel anode, also flat plates. From FIG. 18, for the iron dosage at 2 mA/cm$^2$, three durations were selected. These durations are 165 s, 198 s, and 263 s. All these cases were tested with stationary anode. FIG. 40 compares the experimental concentrations with the theoretical values based on Faraday's Law, in a graph comparing experimental concentrations of iron with theoretical concentrations for flat plates cell, stationary steel anode, initial pH 4.5, NaCl (3000 ppm) in RO water solution, 400 mL volume during electrolysis. FIG. 40 illustrates that for the case with iron, the experimental concentrations are very close to the theoretical concentrations. Hence, the current efficiency is nearly 100%. For the case with 263 s, a trial was conducted with an oscillating anode to compare with the stationary case of 263 s in FIG. 40. The result is as seen in FIG. 41, in a graph comparing stationary vs oscillating anode concentrations of iron with theoretical concentrations for steel flat plates cell, initial pH 4.5, NaCl (3000 ppm) in RO water solution, 400 mL volume during electrolysis. FIG. 41 shows that the oscillating case generated an iron dosage close to the stationary case and both values are close to the theoretical concentration.

The fact that for both the aluminum and iron anodes, the experimental concentrations were close to the theoretical concentrations could suggest that the anode material for both cases is of high purity. If there were other metals present, the concentrations of iron or aluminum would be lower because part of the current would be consumed for the oxidation of those metals.

Examples with the Corrugated Plates Cell

Figure 42:
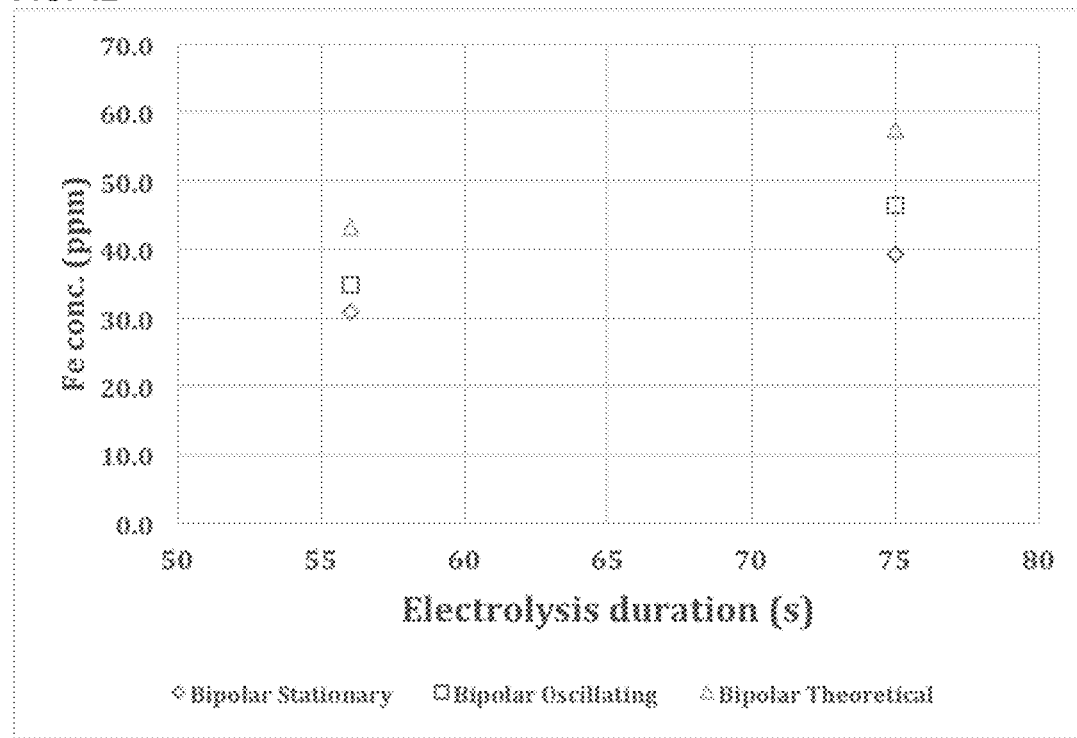
FIG. 42: Comparing experimental concentrations of iron and stationary vs oscillating plates with theoretical concentrations for corrugated plates bipolar cell, steel anode, initial pH 4.5, NaCl (3000 ppm) in RO water solution, 400 mL volume during electrolysis.

For the case with the corrugated plates cell, the cases of bipolar and monopolar were both tested. Comparing the concentrations will help determine if there were bypass effects or not. For both cases, the theoretical concentrations as determined by Faraday's law (assuming 100% current efficiency and no bypass current) and the current density was 2 mA/cm$^2$. Theoretical concentrations of 43.3 mg/L and 57.5 mg/L were the basis for comparison. FIG. 42 compares the experimental concentrations in bipolar configuration for stationary and oscillating to the theoretical concentration, in a graph comparing experimental concentrations of iron and stationary vs oscillating plates with theoretical concentrations for corrugated plates bipolar cell, steel anode, initial pH 4.5, NaCl (3000 ppm) in RO water solution, 400 mL volume during electrolysis.

For the stationary and the oscillating case, the experimental concentrations were significantly lower than the theoretical concentrations. Moreover, the oscillating case concentration was greater than the stationary case. This confirmed the expectation that oscillations would lower bypass currents.

Figure 43:
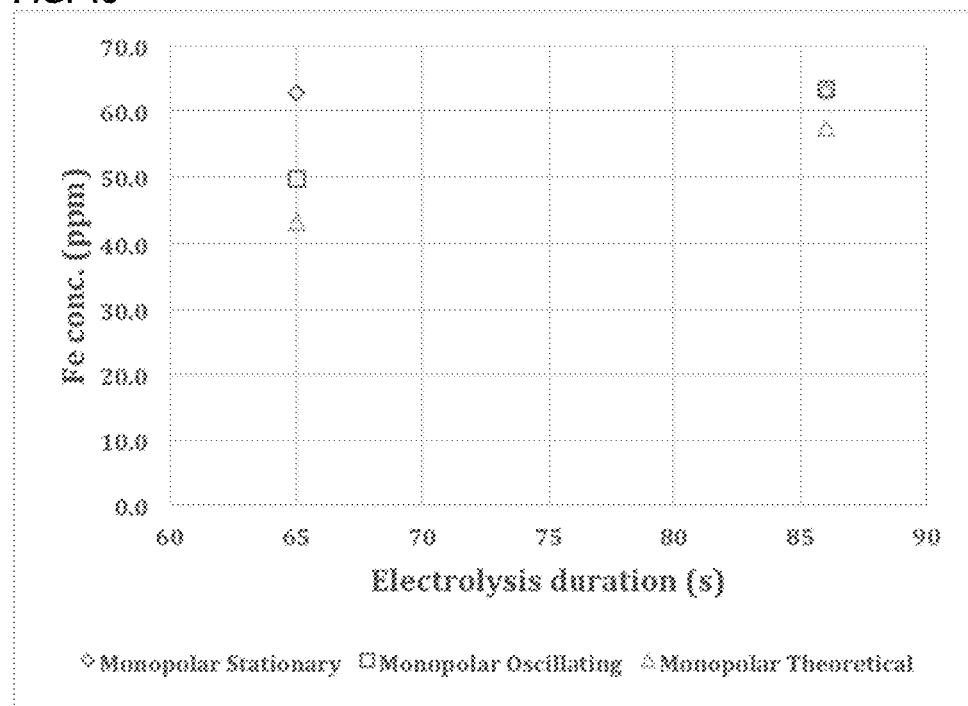
FIG. 43: Comparing experimental concentrations of iron and stationary vs oscillating plates with theoretical concentrations for corrugated plates monopolar cell, steel anode, initial pH 4.5, NaCl (3000 ppm) in RO water solution, 400 mL volume during electrolysis.

FIG. 43 compares monopolar stationary vs oscillating for the same set of theoretical concentrations of 43.3 mg/L and 57.5 mg/L seen in FIG. 42, in a graph comparing experimental concentrations of iron and stationary vs oscillating plates with theoretical concentrations for corrugated plates monopolar cell, steel anode, initial pH 4.5, NaCl (3000 ppm) in RO water solution, 400 mL volume during electrolysis. The corresponding electrolysis durations were determined based on Faraday's Law.

As illustrated by FIG. 43, both the oscillating and the stationary cases had concentrations greater than the theoretical expectations. As the same theoretical concentration was compared in FIG. 42, it is clear that the monopolar concentrations were significantly higher than the bipolar concentrations for a given theoretical concentration. Hence, bypass currents are significant for this cell. However, bypass currents can be reduced in a bipolar cell by introducing oscillations.

Summary of Exemplary Findings

In these Examples, the potential of EC for the removal of fine clay particles has been illustrated. Model synthetic wastewaters were prepared to simulate water contaminated heavily with fine clay particles, which was dispersed using a strong dispersant, sodium poly acrylate.

Different electrochemical reactor designs were tested. Two different anode materials, aluminum and iron from mild carbon steel were tested. Aluminum outperformed steel in terms of turbidity removal, which was the water quality parameter used to test the removal of the fines. The novel concept of an oscillating anode was evaluated. For the case with aluminum flat plates, oscillating the anode reduced the treatment duration by 44% when compared to a current density of 0.5 mA/cm². Oscillating the steel anode reduced the treatment time by 33%. It was observed that to further decrease the treatment time, the current density could be increased, with a proportional decrease in the required treatment time. Sweep flocculation was found to be the predominant mechanism by which the maximum amount of fines can be removed. Examples demonstrated that EC with iron is more effective at a wider range of pH. Aluminum was found to be most effective only between initial pH of 3 to 6, due to its amphoteric nature.

For a cell with multiple corrugated electrodes, oscillating the bipolar configuration was found to be significantly better than stationary bipolar. The treatment time required was reduced by 67% by oscillating the electrodes. For monopolar configuration however, oscillation did not have any significant benefit in terms of treatment performance.

In one aspect of the invention, oscillations reduced the cell potential. By moving the anode closer to one of the nearby electrodes, the potential at a fixed current is reduced. Therefore, there is a net electrochemical energy saving from both reduced treatment time for maximum removals as well reduced cell potential.

Electrochemical energy consumption, an important parameter was seen to be lowered with oscillations for most of the tests when compared with the stationary anodes, except for the monopolar corrugated plates oscillating case. There was a net reduction in the electrochemical energy from reduced treatment time as well as with lowered cell potential as the anode moves closer to the one of the cathodes. To compare with data available from literature, the highly cited literature (Chen, 2004) that review electrochemical technologies for wastewater treatment was used. For this literature which discussed electrocoagulation technologies, the energy consumption with was seen to be in the range of 20-40 W h/m³ for turbidity removal for metal dissolved within the range of 0.15-0.2 mg. From this research, for the case which had the highest energy consumption being the oscillating monopolar cell, the energy consumption to generate between 0.15-0.2 mg of metal would require energy in the range of 19.06-25.41 W h/m³, which is closer to the lower limits reported in the literature.

In accordance with the foregoing, alternative aspects of the invention involve the use of a corrugated cell design to reduce bypass effects (as seen by the ICP results) in bipolar configuration, when oscillating and thus increasing desired product generation and increasing efficiency. In addition, or alternatively, corrugated cells may be designed so as to increase electrochemical pulse current effect when oscillating in bipolar configuration (without oscillations, the pulsing effect may not be present in a bipolar cell). Oscillation may accordingly be applied as a method for reducing cell voltage in water treatment by electrochemistry (including electrooxidation and electro-flotation), thereby decreasing the net electrochemical energy requirement. Similarly, corrugated bipolar electrodes may be employed in some embodiments in methods that decrease the voltage/energy during oscillations when compared to stationary electrodes. The use of oscillation may accordingly be arranged so as to increase in the indirect oxidation of organics present in a wastewater, for example as the anode undergoes increased current flow as it approaches a cathode. In this arrangement, the anode will have higher surface potential, so that more chlorine is generated, thereby increasing the oxidation or organics.

Finally, Examples were conducted using an ICP to determine whether rate of metal dissolution during EC corresponded to 100% current efficiency. For the flat plates cell, the current efficiency was nearly 100%. However for the corrugated plates, depending on the configuration, the current efficiency varied. For the bipolar case, the current efficiency was well below 100%. However for the monopolar case, the current efficiency was greater than 100%. The difference in the concentrations between the monopolar and bipolar case indicates that by-pass currents are significant for this cell.

LIST OF SYMBOLS AND ABBREVIATIONS

A Amperes of Current
AES Atomic Emissions Spectroscopy
Al Aluminum
$e^-$ Electron
EC Electrocoagulation
F Faraday's Constant=96500 C/mole e-
Fe Iron
I Current (A)
ICP Inductively Coupled Plasma
K Kelvin
n number of moles of metal ion generated at the anode (mol)
NTU Nephlometric Turbidity Units
SS Stainless Steel
t Electrolysis Duration (s)
T Temperature (° C. or K)
z From Faraday's Law; i.e. number of moles of electrons involved in the electrochemical reaction per mole of ion generated or consumed

REFERENCES

Ahmadun, F., Pendashteh, A., Abdullah, L., Biak, D., Madaeni, S., & Abidin, Z. (2009). Review of technologies for oil and gas produced water treatment. *Journal of Hazardous Materials,* 170, 530-551.

Ali, I., Asim, M. & Khan, T. A. (2013). Arsenite removal from water by electro-coagulation on zinc-zinc and copper-copper electrodes. *International Journal of Environmental Science and Technology,* 10, 377-384.

Allen, E. W. (2008). Process water treatment in Canada's oil sands industry: I. Target pollutants and treatment objectives. *Journal of Environmental Engineering and Science,* 7, 123-138.

America Water Works Association. (1998). *Standard Methods for the Examination of Water and Wastewater.* Baltimore: United Book Press Inc.

Bryant, J. E., & Haggstrom, J. (2012). An Environmental Solution to Help Reduce Freshwater Demands and Minimize Chemical Use. Proceedings of the SPE/EAGE European Unconventional Resources Conference and Exhibition, 20-22 March 2008, Vienna, Austria, Society of Petroleum Engineers.

Canizares, P., Jimenez, C., Martinez, F., Saez, C., & Rodrigo, M. (2007). Study of the Electrocoagulation Process Using Aluminum and Iron Electrodes. *Industrial and Engineering Chemistry Research*, 46, 6189-6195.

Carpenter, N. G. & Roberts, E. P. L. (1999). Mass Transport and Residence Time Characteristics of an Oscillatory Flow Electrochemical Reactor. *Chemical Engineering Research and Design*, 77, 212-217.

Chen, G. (2004). Electrochemical Technologies in Wastewater Treatment. *Separation and Purification Technology*, 38, 11-41.

Chen, Y., Zhou, B., Li, L., Song, Y., Li, J., Liu, Y., & Cai, W. (2011). Application of Pulse Electrocoagulation to dye wastewater treatment. *Advanced Materials Research*, 233-235, 444-451.

Emamjomeh, M. M., & Sivakumar, M. (2009). Review of pollutants removed by electrocoagulation and electrocoagulation/flotation processes. *Journal of Environmental Management*, 90, 1663-1679.

Fajardo, A. S., Rodrigues, R. F., Martins, R. C., Castro, L. M., & Quinta-Ferreira, R. M. (2015). Phenolic wastewaters treatment by electrocoagulation process using Zn anode. *Chemical Engineering Journal*, 275, 331-341.

Harif, T., & Adin, A. (2007). Characteristics of aggregates formed by electroflocculation of a colloidal suspension. *Water Research*, 41, 2951-2961.

Husein, M., Derizadeh, A., & Harding, T. (2011). Experimental and Modeling Study of MEUF Removal of Naphthenic Acids. *Desalination*, 273, 352-358.

Keshmirizadeh, E., Yousefi, S., & Rofouei, M. K. (2011). An investigation on the new operational parameter effective in Cr(VI) removal efficiency: A study on electrocoagulation by alternating pulse current. *Journal of Hazardous Materials*, 190, 119-124.

Khamelsky, A. M., Payusov, S. A., Talanov, A. G. & Yurkov, Y. N., (2000). *Method for Purification of Wastewater using an Electric Coagulator.* United States of America, U.S. Pat. No. 6,077,416

Liu, H., Zhao, X., & Qu, J. (2010). Electrocoagulation in Water Treatment. In *Electrochemistry for the Environment* (pp. 245-263). Springer.

Ma, H., & Wang, B. (2006). Electrochemical pilot-scale plant for oil field produced wastewater by M/C/Fe electrodes for injection. *Journal of Hazardous Materials*, 132, 237-243.

Masliyah, J., Zhou, Z. J., Xu, Z., Czarneciki, & J., Hamza, H. (2008). Understanding Water—Based Bitumen Extraction from Athabasca Oil Sands. *The Canadian Journal of Chemical Engineering*, 82, 628-654.

Micro Magazine.com. (2007). *Micro Magazine.* http://micromagazine.fabtech.org/archive/98/01/small.html Mikula, R. J., Munoz, V. A., & Omotoso, 0. (2008). Water Use in Bitumen Production: Tailings Management in Surface Mined Oil Sands. Proceedings of the Canadian International Petroleum Conference, 17-19 Jun. 2008, Calgary, Alberta, Petroleum Society of Canada.

Mollah, M. Y., Schennach, R., Parga, J. R., & Cocke, D. L. (2001). Electrocoagulation (EC)- Science and Application. *Journal of Hazardous Materials*, 84, 29-41.

Mollah, M. Y., Morkovsky, P., Gomes, J. A., Kesmez, M., Parga, J., & Cocke, D. (2004). Fundamentals, present and future perspectives of electrocoagulation. *Journal of Hazardous Materials*, 114, 199-210.

Moussavi, G., Khosravi, R., & Farzadkia, M. (2011). Removal of petroleum hydrocarbons from contaminated ground water using an electrocoagulation process: Batch and continuous experiments. *Desalination*, 278, 288-294.

Nix, P. G., & Martin, R. W. (1992). Detoxification and Reclamation of Suncors Oil Sand Tailings Ponds. *Environmental Toxicology and Water Quality*, 7, 171-188.

Reynolds, T. & Richards, P., 1996. *Unit Operations and Processes in Environmental Engineering.* 2nd ed. :Cengage Learning.

Saidi-Mehrabad, A., He, Z., Tamas, I., Sharp, C. E., Brady, A. L., Rochman, F. F., Bodrossy, L., Abell, G. C., Penner, T., Dong, X., Sensen, C. W., & Dunfield, P. F. (2013). Methanotrophic bacteria in oilsands tailings ponds of northern Alberta. *The ISME Journal*, 7, 908-921.

Vasudevan, S., Lakshmi, J., & Packiyam, M. (2010). Electrocoagulation studies on removal of cadmium using magnesium electrode. *Journal of Applied Electrochemistry*, 40, 2023-2032.

Younker, J., Lee, S., Gagnon, G., & Walsh, M. (2011). Atlantic Canada Offshore R&D: Treatment of oilfield produced water by chemical coagulation and electrocoagulation. Proceedings of the Offshore Technology Conference, 2-5 May 2011, Houston, Tex., Offshore Technology Conference.

Zhu, B., Clifford, D. A., & Chellam, S. (2005). Comparison of electrocoagulation and chemical coagulation pretreatment for enhanced virus removal using microfiltration membranes. *Water Research*, 39, 3098-3108.

CONCLUSION

Although various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way. Numeric ranges are inclusive of the numbers defining the range. The word "comprising" is used herein as an open-ended term, substantially equivalent to the phrase "including, but not limited to", and the word "comprises" has a corresponding meaning. As used herein, the singular forms "a", "an" and "the" include plural referents unless the context clearly dictates otherwise. Thus, for example, reference to "a thing" includes more than one such thing. Citation of references herein is not an admission that such references are prior art to the present invention. Any priority document(s) and all publications, including but not limited to patents and patent applications, cited in this specification are incorporated herein by reference as if each individual publication were specifically and individually indicated to be incorporated by reference herein and as though fully set forth herein. The invention includes all embodiments and variations substantially as hereinbefore described and with reference to the examples and drawings.

The invention claimed is:

1. An electrocoagulation cell comprising:
    a nonconductive housing containing a conductive aqueous wastewater electrolyte;
    an anode plate disposed in the electrolyte within the housing, the anode plate having opposing sides;
    a cathode comprising at least two cathode plates disposed in the electrolyte within the housing spaced apart from the opposing sides of the anode plate, so that the electrolyte provides conductivity between both sides of the anode and the cathode;
    a constant DC current source connecting the anode and the cathode, configured to supply a current between both sides of the anode plate and the cathode in a current direction and thereby apply a potential difference across the electrocoagulation cell;

an oscillating linkage mediating a physical oscillation of the disposition of the anode relative to the cathode, wherein the physical oscillation disposes the anode relative to the cathode in a direction that has a component that is perpendicular to the current direction and wherein the cathode is fixed while the anode oscillates;

wherein the current source and the oscillating linkage are configured so that the physical oscillation causes an oscillation in the potential difference across the cell as current flows in the current direction.

2. The electrocoagulation cell of claim 1, wherein one or both of the anode and cathode comprise corrugations, so that a corrugated electrode undulates across a plane that is perpendicular to the current direction.

3. The electrocoagulation cell of claim 2, wherein the anode and the cathode comprise interdigitating corrugations, with undulations of corresponding direction and magnitude across parallel planes that are perpendicular to the current direction.

4. The electrocoagulation cell of claim 3, wherein the anode oscillates and the cathode is stationary.

5. The electrocoagulation cell of claim 3, wherein the cathode oscillates and the anode is stationary.

6. The electrocoagulation cell of claim 3, wherein the cathode and the anode oscillate.

7. The electrocoagulation cell of claim 3, wherein the aqueous electrolyte comprises a contaminant, and when current is passed in the electrocoagulation cell the anode is oxidized to form cations by electrodissolution thereby forming coagulating agents that coagulate the contaminant to form a coagulated contaminant.

8. The electrocoagulation cell of claim 7, wherein the coagulated contaminant forms a precipitate or a flocculate.

9. The electrocoagulation cell of claim 8, wherein the contaminant comprises one or more of: an organic compound; a hydrocarbon; a heavy metal; a silicate; a sulfide; suspended colloidal particles; emulsified oil; a compound of calcium, magnesium, chromium, copper, zinc, nickel, cadmium, boron, or tin; oil; naphthenic acids; polycyclic aromatic hydrocarbons; benzene; lead; arsenic; or, mercury.

10. The electrocoagulation cell of claim 8, wherein the contaminant comprises clay particles less than 44 microns in diameter.

11. The electrocoagulation cell of claim 8, wherein the contaminant comprises a chloride and free chlorine is generated at the anode when current is passed in the electrocoagulation cell.

12. The electrocoagulation cell of claim 8, wherein the anode comprises aluminum or iron.

13. The electrocoagulation cell of claim 1, wherein the anode comprises a plurality of electrode plates in an anode plate set.

14. The electrocoagulation cell of claim 1, wherein the cathode comprises a plurality of electrode plates in an cathode plate set.

15. The electrocoagulation cell of claim 14, wherein the current source, anode and cathode plate set are arranged to form a monopolar electrocoagulation cell.

16. The electrocoagulation cell of claim 14, wherein the current source, anode and cathode plate set are arranged to form a bipolar electrocoagulation cell.

17. The electrocoagulation cell of claim 1, further comprising a liquid inlet positioned to admit wastewater electrolyte to the electrocoagulation cell and a liquid outlet positioned to remove wastewater electrolyte from the cell.

18. The electrocoagulation cell of claim 1, wherein the current source is configured to temporarily or periodically mediate reversal of the current between the anode and the cathode.

19. An electrocoagulation process, comprising:

applying a current to an anode and a cathode in a conductive aqueous wastewater electrolyte contained in a nonconductive housing of an electrocoagulation cell, so that the electrolyte provides conductivity between the anode and the cathode in a current direction and a potential difference is applied across the electrocoagulation cell; and oscillating a physical disposition of the anode relative to the cathode;

wherein the current is applied and the physical oscillation is arranged so that the physical oscillation causes an oscillation in the potential difference across the cell as current flows in the current direction and wherein the cathode is fixed while the anode oscillates.

* * * * *